(12) United States Patent
Barrett et al.

(10) Patent No.: US 11,196,894 B1
(45) Date of Patent: Dec. 7, 2021

(54) MAPPING A USER'S SELECTION FOR A FINISHING JOB TO SUBSYSTEMS OF AN IMAGING DEVICE

(71) Applicant: Xerox Corporation, Rochester, NY (US)

(72) Inventors: Michael W. Barrett, Fairport, NY (US); Michael D. Sprague, Macedon, NY (US); Stephen Santini, Honeoye Falls, NY (US); George Gough, Webster, NY (US); Robert L. Larson, Rochester, NY (US); Paul Roberts Conlon, South Bristol, NY (US)

(73) Assignee: Xerox Corporation, Norwalk, CT (US)

(*) Notice: Subject to any disclaimer, the term of this patent is extended or adjusted under 35 U.S.C. 154(b) by 0 days.

(21) Appl. No.: 16/952,816

(22) Filed: Nov. 19, 2020

(51) Int. Cl.
*H04N 1/387* (2006.01)
*H04N 1/00* (2006.01)

(52) U.S. Cl.
CPC ......... *H04N 1/3877* (2013.01); *H04N 1/0009* (2013.01); *H04N 1/00466* (2013.01); *H04N 1/3873* (2013.01)

(58) Field of Classification Search
CPC ........... H04N 1/00456; H04N 1/00466; H04N 1/00721; H04N 1/00809; H04N 1/233; H04N 1/2338; H04N 1/2384; H04N 1/3873; H04N 1/3877; G06F 3/1206; G06F 3/1208; G06F 3/1237; G06F 3/1256; G06K 15/1868; G06K 15/1885; G06K 15/1886
See application file for complete search history.

(56) References Cited

U.S. PATENT DOCUMENTS

| | | | | |
|---|---|---|---|---|
| 6,154,286 A | * | 11/2000 | Konno | G03G 15/221 358/1.13 |
| 8,564,832 B2 | | 10/2013 | Conlon | |
| 8,773,707 B2 | | 7/2014 | Conlon | |
| 8,891,900 B2 | | 11/2014 | Conlon | |
| 2008/0088875 A1 | * | 4/2008 | Taira | G03G 15/6538 358/1.15 |

OTHER PUBLICATIONS

IPP Finishings 2.0 (FIN), The Printer Working Group Dec. 19, 2014, 59 Pages, Dec. 19, 2014.

* cited by examiner

*Primary Examiner* — Scott A Rogers
(74) *Attorney, Agent, or Firm* — Fleit Intellectual Property Law; Jon Gibbons

(57) ABSTRACT

Disclosed is a novel system and method to enables users to map a user's intent finishing selections for a finishing job to each subsystem, e.g., device, protocol, ADF, and finisher unit, of an imaging device. The presently claimed invention creates distinct perspectives and a way to map between perspectives. The distinct perspectives include intent orientation, a print protocol, ADF, copy/scan/fax platen, device, and finisher unit. Through use of novel transformation for automating image rotations to dramatically reduce errors with understandable and repeatable correct outcomes. The formal algorithmic and mathematical approaches disclosed in the present invention makes it easier to describe subsystems of an imaging device. The software implementation using this novel approach eliminates the need for conditional logic based programming customized for each imaging device and its various subsystems.

20 Claims, 9 Drawing Sheets

MAPPING A USER'S SELECTION FOR A FINISHING JOB TO SUBSYSTEMS OF AN IMAGING DEVICE

TECHNICAL FIELD

The present invention is directed to systems and methods for operations performed by a finisher unit for a printer or multifunction device (printer, fax, scan, copy) across different printing protocols, different imaging devices with different print paths and/or scan paths, and different finisher units.

BACKGROUND

Complex image forming systems combine image forming processes and associated media handling and finishing processes. In the field of image forming devices, very complex production-type systems for advanced image forming, and the associated media handling, have been, and continue to be, developed and deployed. These complex image forming systems may include, for example, multiple stages of image processors with a plurality of feeder devices and a number of finishing devices. Image receiving media flow through these complex image forming (and media handling) systems via multiple paths in an intricate and variable manner according to a particular image forming operation requested by a user and carried out by the complex image forming and finishing systems.

An ordering of the multiple devices in these complex image forming systems can be changed. Individual devices are reordered or replaced in a particular complex image forming system for myriad reasons. As a result, imaging and image receiving media flow paths through the complex image forming systems can be changed and can often become confused. In many instances, a result of this confusion is that image forming errors and/or finishing errors occur.

Quality issues often arise with image orientation while finishing. Current approaches make it difficult to present finishing choices to users and external systems, as well as to internally adapt to diverse configuration while ensuring correct output. The system is fragile and confusing for both users and product development. Current approaches typically rely on trial & error to achieve an outcome, and this often has serious consequences in which one aspect of a print job is correct but causing unforeseen errors to another aspect of the print job. The code is extremely difficult to maintain because it attempts to keep track of finishing scenarios via traditional conditional logic of states.

Absent smart algorithms in complex image forming systems with multiple feeders and finishers, functions that are undertaken, for example, by subsystems including printer protocols, automatic document feeders, imaging devices and finishers will rely on default settings that will produce results that are not in accordance with the user's desires, or as the user "intends." In other words, processing within device will remain device centric, rather than user centric.

Accordingly, what is needed in this art are increasingly sophisticated systems and methods to provide predictable print job behavior across printer protocols, automatic document feeders, copy/scan/fax platens, imaging devices, and finishing units.

INCORPORATED REFERENCES

The following U.S. patents, U.S. patent applications, and Publications are incorporated herein in their entirety by reference.

"Frame-Based Coordinate Space Transformations Of Graphical Image Data In An Image Processing System", by Paul R. Conlon, U.S. Pat. No. 8,891,900, filed Jun. 8, 2011.

"Image Operations Using Frame-Based Coordinate Space Transformations Of Image Data In A Digital Imaging System", by Paul R. Conlon, U.S. Pat. No. 8,564,832, filed Jun. 8, 2011.

"Method And System For Utilizing Transformation Matrices To Process Rasterized Image Data", by Paul R. Conlon, U.S. Pat. No. 9,619,738, filed: Dec. 18, 2008.

"Method And System For Utilizing Transformation Matrices To Process Rasterized Image Data", by Paul R. Conlon, U.S. patent application Ser. No. 12/338,300, filed: Dec. 18, 2008.

"Method And System For Utilizing Transformation Matrices To Process Rasterized Image Data", by Fan et el., U.S. Pat. No. 9,530,230, filed: Dec. 18, 2008.

"Method And System For Utilizing Transformation Matrices To Process Rasterized Image Data", by Fan et el., U.S. Pat. No. 8,754,909, filed: Dec. 18, 2008.

"Architecture For Controlling Placement And Minimizing Distortion Of Images", by Conlon et al., U.S. Pat. No. 8,553,275, filed: Nov. 9, 2009.

"Controlling Placement And Minimizing Distortion Of Images In An Imaging Device", by Conlon et al., U.S. Pat. No. 8,559,050, filed: Nov. 9, 2009.

BRIEF SUMMARY

Described is an improved method and system to map a user's intended finishing property selections as part of a finisher job to each subsystem, e.g., imaging device, protocol, ADF, and finisher unit. The presently claim invention creates distinct perspectives and a way to map between perspectives. The distinct perspectives include a user's intent orientation to be realized through different print protocols, ADFs, copy/scan/fax platens, imaging devices, and finisher unit. Through use of novel transformation for automating image rotations to dramatically reduce errors with understandable and repeatable correct outcomes. The formal algorithmic and mathematical approaches disclosed in the present invention makes it easier to describe subsystems of a imaging device. The software implementation using this novel approach minimizes and often eliminates the need for traditional conditional software logic and case statements programming customized for each imaging device and its various subsystems. Current approaches are rigid and difficult to modify/verify.

The method for mapping a user's selection for a finishing job to a subsystem of an imaging device starts with receiving a user's selection representing one or more selectable finishing options relative to an Intent orientation with an Intent finishing edge for a finishing job with an identified imaging device. Next input image data is accessed in an input orientation for the finishing job. A first transformation representing a first mapping between input image data in the input orientation and a first orientation (upright) is obtained. Next, a second transformation representing a second mapping between the first orientation (upright) and the identified imaging device is obtained. A transformation operation is performed on the input image data to create transformed image data by transforming the input image data through the first transformation and the second transformation, whereby the transformed image data implements the one or more selectable finishing properties relative to the Intent orientation. The transformed image data can be stored ready for the finisher unit and printer, or sent to the printer and finishing unit.

Besides transformations for a specific imaging device, and the finisher unit, additional transformations are used for each of a specified print protocol, scan/copy/fax platen, and an automatic document feeder.

Many features and advantages of the above-described method will become readily apparent from the following detailed description and accompanying drawings.

BRIEF DESCRIPTION OF THE DRAWINGS

The foregoing and other features and advantages of the subject matter disclosed herein will be made apparent from the following detailed description taken in conjunction with the accompanying drawings, in which.

DETAILED DESCRIPTION

Figure 1:
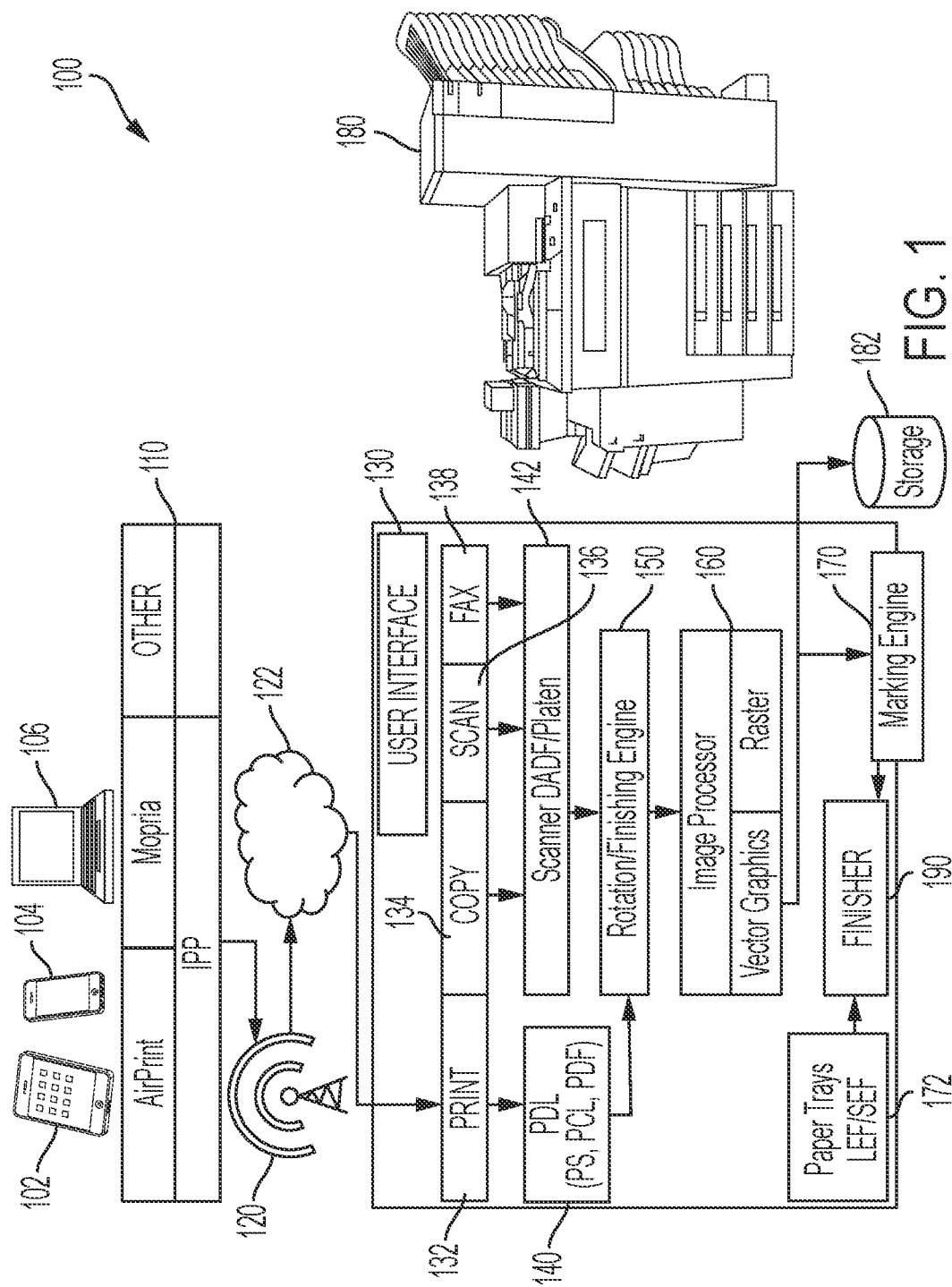
FIG. 1 is an illustration of a multi-function machine with print, scan, fax, and copier capabilities and remote devices printing using various print protocols.

What is provided are a system and method which enables users to map a user's Intent finishing selections for a finishing job to each subsystem, e.g., device, protocol, ADF, and finisher unit, of a imaging device. The presently claimed invention creates distinct perspectives and a way to map between perspectives. The distinct perspectives include printing protocol (could be abstractly a finishing job submission protocol. For example IPP other conventions for the copy/scan path. Other perspectives are intent, device: logical finisher, device: physical finisher. These last two are device perspectives. There is one logical (abstract/canonical) device perspective, and any number of physical device perspectives. Each having their own spaces, and the patent really is about mapping between any number of spaces, each with its own unique perspectives and conventions.

Through use of novel transformation for automating image rotations to dramatically reduce errors with understandable and repeatable correct outcomes. The formal algorithmic and mathematical approaches disclosed in the present invention makes it easier to describe subsystems of an imaging device. The software implementation using this novel approach minimizes or eliminates the need for extensive and many times nested conditional logic based programming customized for each imaging device and its various subsystems.

Non-Limiting Definitions

An "automatic document feeder" or "ADF" is a subsystem on copiers and scanners which takes several pages and feeds the paper one page at a time into a scanner or copier, allowing the user to scan, and thereby copy, print, or fax, multiple-page documents without having to manually replace each page.

A "copy/scan/fax platen" or simply a "platen" is a subsystem on copiers and scanners, typically a flat glass surface on which operators place papers or books for copying, scanning and faxing.

A "canonical coordinate space" is a coordinate space that is typically independent of the coordinates from both a source image processing device and a target image processing device. For simplicity, an example of a canonical coordinate space used in the present method and system, has the origin offset set to zero, i.e., {0,0,0} on a 3D Cartesian coordinate system. The canonical coordinate space mapping uses a canonical matrix form which is functionally equivalent to a standard coordinate space with unit vectors. Although all the mathematical operations hereof are shown in 3D, it should be appreciated that these same mathematical operations are equally applicable to 2D which is the sub-set dimensionality for many document imaging system applications which is subsumed in the 3D framework.

A "coordinate space" refers to a 2D or 3D rectangular coordinate system, such as a standard Cartesian coordinate system. Each coordinate space has a unique origin where two or more of the axes intersect. The coordinate space is not limited to rectangular (orthogonal) coordinate systems.

"Emulation" is the process of imitating an order-of-operation specific behavior on a particular imaging system that enables it to do the same work, run the same production jobs/tickets, as another imaging system. The process of emulation can be carried out in software, and/or hardware or a special purpose computer processing system configured to perform emulation as defined herein.

A "finisher" or "finisher unit" is a subsystem that can be added to an imaging system such as a printer or photocopier that provides various functions such as large capacity trays, collating, sorting, stapling, two hole or three hole punch, booklet making and more.

A "finishing edge" or "binding edge" is the edge of a printed sheet or paper web or imaginable substrate on which binding or hole punch or stapling/fastening or folding operation or cutting operation is to occurs.

A "finisher job" is a subset of print, copy, scan, fax job that instructs the finisher unit on functions to perform.

A "finishing property" is part of a finishing job that specifies an Intent finishing edge and one or more finishing operations. The finishing job instructs the finisher unit on functions to perform.

An "image" refers to a spatial pattern of physical light comprised of known colors of the light spectrum which are visible by the human eye. When reduced to capture or rendering, the image generally comprises a plurality of colored pixels. A printed image (or image print) would be a photograph, plot, chart, and the like, as are generally known. When an image is rendered to a memory or storage, the values of the color pixels are generally stored in any of a variety of known formats such as, for example, BMP, JPEG, GIF, TIFF, or other formats employed for storing image data on a storage media for subsequent retrieval. Received pixels of an input image are associated with one or color value, grayscale value or monochrome value. A color value is defined in terms of a color space, comprising typically 3 color coordinates or axes.

An "imaging device" is any device with at least one of an image input device or an image output device or both. The set of image output devices includes xerographic reproduction systems, multifunction devices, monitors and other displays, image processors (including Graphics Processing Units or GPU), computer workstations and servers, and the like.

An "image input device" is any device capable of capturing image data as an image capture device and/or for reproduction and display of an image as an image output device. The collection of image output devices includes xerographic systems, multifunction devices, cameras, scanners, copiers and the like.

An "image output device" is any device capable of rendering that image data from an image input device. The collection of image output devices includes xerographic systems, multifunction devices, printers, 3-D printers, copiers, cloud storage, local storage, email, fax, and the like.

An "imagable substrate" is a substrate such as paper, film, cardstock, photographic paper, Mylar, and other printable surfaces, upon which an image can be marked or printed.

"Image data" refers to an image data in any of a variety of known formats. The sources of input image data can be from a scanner job (copy/scan/fax or camera) or from a print job. A print job may be printer description language (PDL) that uses a RIP (Raster Image Processor) to generate internal raster data. Print jobs can have embedded images or be full raster print jobs such as multi-page TIFF. The types of file formats include BMP, JPEG, GIF, TIFF, or other internal raw raster formats for either a print path or a scan path or other formats employed for storing image data on a storage media (hard drivers, USB drives, cloud backup, on-premise or across enterprise premises) for subsequent retrieval prior to being processed through one or more transformation operations. Stored image data can be reprinted later on same or different output device including devices at geographically disparate locations. Stored image data is "finish ready" orientation, that is the finishing edge and the Intent orientation reflected in the image content is already mapped to the printer. For example, a print ready orientation can be created for a physical printer, or can be set to canonical/intent orientation and finishing. For example, receiving an IPP finishing request and some odd orientation, the system can map the finishing request to intent and make the image upright. Alternatively, if the specific physical configuration is known, it can be mapped to a lower level. The first eliminates the IPP space transformation rotation to Intent space, the second eliminates a rotation from intent to device space.

An "intent orientation" also called "upright orientation" or "reading orientation" refers to as a user would view the document or hold the document for viewing. The Intent orientation may include an Intent finishing edge.

A "mapping within a given coordinate spaces" is a mapping in a same coordinate space such as image shift, image reflection, and image rotation.

A "mapping between across coordinate spaces" is a mapping between coordinate spaces, such as, between vector space to raster space, or image space to device space, or raster space to device space, as example. In this context, mapping between a print protocol such as IPP, an Intent space, and Device space(s).

"Output image data" is data generated from the input image data, for example a PDF job input data type that has been rasterized and saved to JPEG.

A "print job" is a single queueable print system object that represents an image or document that needs to be rendered and transferred to a printer. Print jobs may include various components such as Job Id: Uniquely identifies the print job for the given print queue, Spool file: It is responsible for the on-disk representation of data,
Shadow File: The on-disk representation of the job configuration,
Status: Includes
  Spooling: Denotes the message that the printing application is still working.
  Printing: Denotes the message that spool file is being read by the print processor.
  Printed: Denotes the message that the job has been fully written to the port.
Finishing request identifies finishing operations such as binding or hole punch or stapling/fastening or folding operations or cutting operations along an identified edge, and
Other configuration: Name, set of named properties, etc.

A "printing protocol". refers to set of rules or procedures or specifications for transmitting data between client devices (computers, mobile phones, tablets, etc.) and printers (or print servers). Protocols are typically realized in software that may be packaged into subsystems. It allows clients to submit one or more print jobs to the printer or print server, and perform tasks such as querying the status of a printer, obtaining the status of print jobs, or cancelling individual print jobs. Examples of printing protocols includes both wired protocols such as Internet Print Protocol (IPP), AirPrint®, and Mopria print service.

The phrase "selectable print properties" or "user intent" or is a desired outcome of a print job that includes one or more of landscape or portrait orientation, print margins, double sided printing, enlarge or reduce print area, paper size, paper or media type, booklet, hole punch position on a finishing edge, and staple position on a finishing edge.

The phrase "subsystem of an imaging device" refers to any hardware or software component that may need a transformation operation to properly carry out or implement the selectable print properties in Intent orientation. Examples of subsystems include the ADF, the copy/scan/fax platen, the print protocol, the imaging device, the finisher unit, and PDLs which have their own coordinate space.

The term "storing" refers to storing input image data or transformed image data in any storage medium including, volatile and non-volatile memory, USB drives, memory sticks, cloud storage or any combination.

A "transformation operation" or "transform" as used herein refers to a mathematical operation to map within a coordinate space and/or between distinct coordinate spaces. Specific transformations are scaling, translation, reflecting, and rotation. The transformation can use forward or inverse predefined matrices for each subsystem of an imaging device. Imaging device transformation 2D and device transformation 3D (stapler orientation, multiple device orientations)

"Transformed image data" refers to an input image data that has been through one or more transformation operations to properly carry out or implement the selectable print properties in intent orientation.

Overview

Individual component devices with the complex image forming system operate according to their own default coordinate spaces in two dimensions for imaging and in three dimensions with regard to image receiving medium orientations. The system designer and/or programmer must piece together individual component devices of the complex image forming system initially according to a complex iterative trial and error process in order to provide a complex image forming system in which a user obtains an output from his or her requested imaging job according to the user's desires. For example, if a sheet of image receiving media goes through a complex system, and at the output of the complex system, the image is upside down, or otherwise not in the desired or expected orientation, the system designer and/or programmer may add a rotation to account for this discrepancy. There will be instances, however, where the addition of such steps is not possible. Such infeasible scenarios are not easily identified via current techniques. Here since scenarios may be programmatically iterated they can be detected. Today infeasible scenarios are either rejected or not well-handled. Devices export their finishing capabilities. With these new techniques it would be possible to only advertise feasible scenarios.

Once this complex iterative trial and error method is completed for a particular complex system, the system designer and/or programmer is not finished. The schemes that result from the trial and error process remain very fragile. Even slight changes in operations can cripple the correctness of the solution. When a particular component in the complex image forming system is replaced, the process must be repeated, often again in a trial and error manner, in order to obtain a repeatable outcome that is according to the user's desires. In other words, any slight change in configuration for the system may render previous trial and error efforts to determine a correct scheme a nullity. Changes may break other working scenarios in subtle or unobvious ways. Without a formal approach the only way to verify there are no unforeseen impacts extensive scenario testing must be performed to ensure quality. Due to the combinatoric nature of finishing scenarios, media orientation, multiple mappings, and multiple device finishing configurations, and differing image and paper paths, enumerating scenarios is extremely difficult, which may result in missed inadvertent new defects introduced by correcting a new problem scenario.

Specifically, in finishers, a user may wish to specify that stapling occurs in, for example, the upper left corner. Complex image forming systems may, however, include multiple finishers. Specification of the upper left corner may result in different, and often wrong, finishing based on the orientation of the image receiving medium as it flows through the complex image forming system and is presented to the finisher. In other words, the finisher is unintelligent with respect to the overall architecture of the system it is integrated with. The finisher will always recognize upper left corner with respect to its own internal and device-specific default frame of reference. If the sheet of image receiving medium is rotated as it travels through the complex image forming system and arrives at the finisher rotated 0°, 90°, 180°, or 270°, from the orientation that the finisher expects, the finisher generally will not recognize any of these differing orientations. Moreover, imagable substrates, such as forms, can be loaded long-edge-feed (LEF) or short-edge-feed (SEF). With pre-printed forms the orientation is significant. In production it may be common to have sheet rotators that physically rotate the paper in the paper path 90 degrees. The outcome of this failure in recognition is that the finishing operation, i.e., the stapling in this example, will be undertaken by the finisher according to the "upper left corner" as the finisher recognizes that position, which will not be as the user intended. The finisher its own methodology of finishing. This makes finishing units blind to the image orientation. This must be handled by the system. Stated differently the finisher has its own unique and compartmented view or limited perspective for finishing and positions. For example, the finisher unit typically has only a single finishing edge for say stapling. To achieve a staple in the intended position, images by system rotations.

Finishers often operate according to specific fixed configurations or enumerations. For example, enumeration 1 may specify upper left corner. Other individual enumerations 2-4 may then specify other positions on the image receiving medium as the position that the finisher is going to act upon in carrying out its operation. These enumerations cannot be rotated according to conventional schemes as appropriate when the sheet of image receiving medium is rotated out of its desired or expected orientation according to the finisher. Without the ability to rotate an enumeration it is difficult to maintain the correct image and relative finishing position. The present invention provides the ability to rotate the finishing position along with the image, complex and error prone mappings are required. A user may select which of the enumerations the user desires, e.g., a position at which the user wants the document to be stapled. If the image receiving medium arrives at the finisher orthogonally rotated in some orientation different from the default orientation used by the finisher, user's intended selection is not carried out because the finisher operates on the image receiving medium in the orientation that it is presented to the finisher according to the specified enumeration. This places a tremendous burden on the software/developer that controls the system. Inflexibility leads to inflexible, finisher-specific code being developed to handle various scenarios. This "solution" becomes unmanageable and error prone quickly.

Imaging jobs, such as printing, in today's distributed enterprise, wireless and internet environment results in different and often unpredictable finishing job behavior. Unpredictable print job behavior is a major usability issue and large source of user frustration resulting in recurring customer complaints over the years. There are four distinct sources of unpredictable print job behavior. These four distinct sources of unique print job behavior are due to:

i. printer protocols, especially wireless and internet printer protocols such as Internet Print Protocol (IPP), AirPrint, and Mopria print service;

ii. imaging devices, such as multifunction devices (MFD) that provide printing, copying and faxing, themselves;

iii. automatic document feeder (ADF) and/or copy/scan/fax platen characteristics; and iv. finishing units connected to imaging devices that stapled sets into an offset catch tray. Many times a finisher will also provide sorting and/or collating functions and hole punching options.

Finisher jobs combined with unique printer protocols, automatic document feeders, imaging device scan paths, imaging device printer paths, and finisher unit behaviors results in complex interactions and scenarios results in finishing job behavior that is difficult to understand.

Software code to address these three distinct sources of unpredictable print job behavior often times is not designed to work interchangeably. Today's software relies heavily on conditional logic based on device components/configuration. Debugging problem scenarios is time consuming, requiring significant senior level engineering expertise to perform investigations.

The presently claimed invention greatly simplifies concepts for both end users or customers and product development engineers. The present invention leverages industry standard (IPP) finishing conventions extended to be more functional. Finishing may be described in native perspectives, and mappings are provided between perspectives, such as, forward/inverse mappings.

Further the present invention introduces a new functional way to work with finishing edges, such that they now become dynamic rotatable objects useful for finishing edge alignment from logical IPP through Intent perspective to physical finishing Device perspectives i.e. the notion of logical vs physical device spaces/orientation. The present invention may be applied as an improvement for external conventions such as those found in IPP and Job Definition Format (JDF).

The present invention enables a user to specify finishing requirements in an "intent-based" fashion. As they would hold, view and interact with a document, without regard to the particular device configuration and behavior. IPP, which has emerged as the leading client printer interface, has a confusing and unnatural finishing model. How finishing devices behave is a function of both the component and how it is integrated into an imaging system. Sometimes finishing occurs on a lead edge of a sheet relative to traveling in a paper path, other times on a trailing edge. Still other times the paper paths are face up, and other times face down. These multiple, interoperating perspectives are a significant cause of confusion. All of the factors mentioned above contribute to recurring finishing and image orientation errors, causing customer dissatisfaction while incurring significant support resources and related expense to remedy.

High Level View of Print, Scan, Copy and Fax with a Multi-Function Machine

FIG. 1 is an illustration 100 of a multi-function machine with print, scan, fax, and copier capabilities and remote devices printing using various print protocols. Shown are client devices a tablet computer 102, a smartphone 104, and a laptop 106, that are communicating over a cellular wireless network 120 to the internet 122 through to a multifunction machine 180 with a print protocol 110 as shown. In another example one or more client machines are communicatively coupled to the multifunction machine 180 through a wired network, such as a local area network (not shown).

Major sub-systems of the multifunction machine 180 are shown. The major sub-systems include a user interface 130 used to display status and receive user selections. The selections may include one or more selectable finishing properties. Two primary paths for the image data are shown. The first primary path is a print path 132 typically implemented through a PDL 140 interpreter. The second primary path is a copy 134, scan 136, and fax 138 through automatic document feeder (ADF) with scanner/platen 142. These two primary paths of the print path 132 and the copy/scan/fax path 134, 136, 138 come together with rotation/finishing engine 150 implemented with a processor and software. The image processor 160 includes capabilities for both vector graphics and raster processor. One or more transforms operations are applied by a combination of the rotation/finishing engine 150 and image processor 160 to the image data. The transformed image data is ready for the finisher unit which is referred to in this patent as "print ready". The transformed image data is either stored in storage 182 for printing later or immediately sent to the marking engine 170 for immediate printing. The storage as shown discussed below in FIG. 2 may be internal or external storage, fax, email or cloud-based storage After the transformed image data is printed by the marking engine 170 using various types and sizes of imagable substrates from the paper trays 172 the finisher 190 begins and specified finisher job as part of the overall print job.

Detailed View of Print, Scan, Copy and Fax with a Multi-Function Machine

Figure 2:
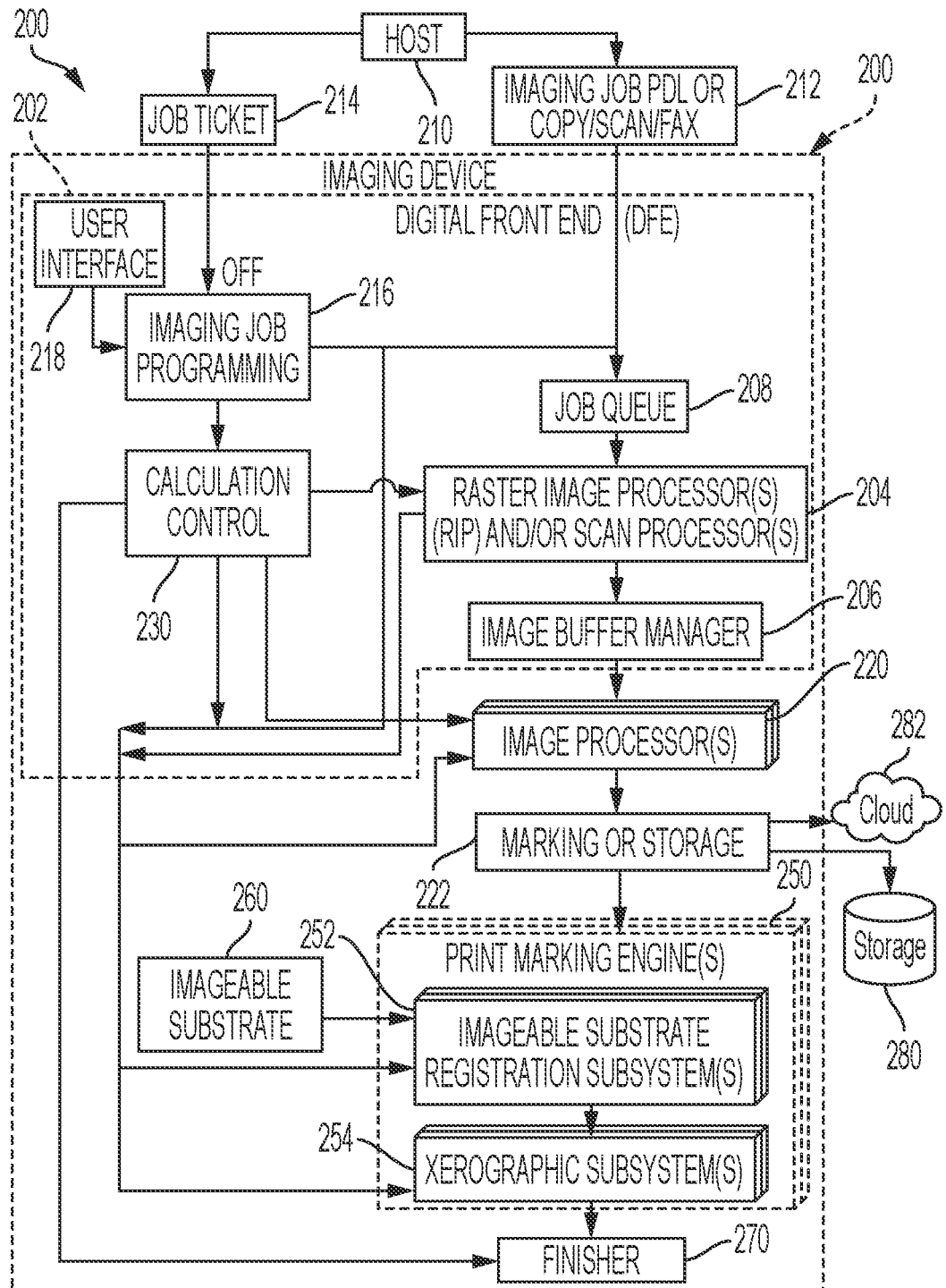
FIG. 2 is block diagram of the major components of the multi-function machine of FIG. 1.
Figure 7:
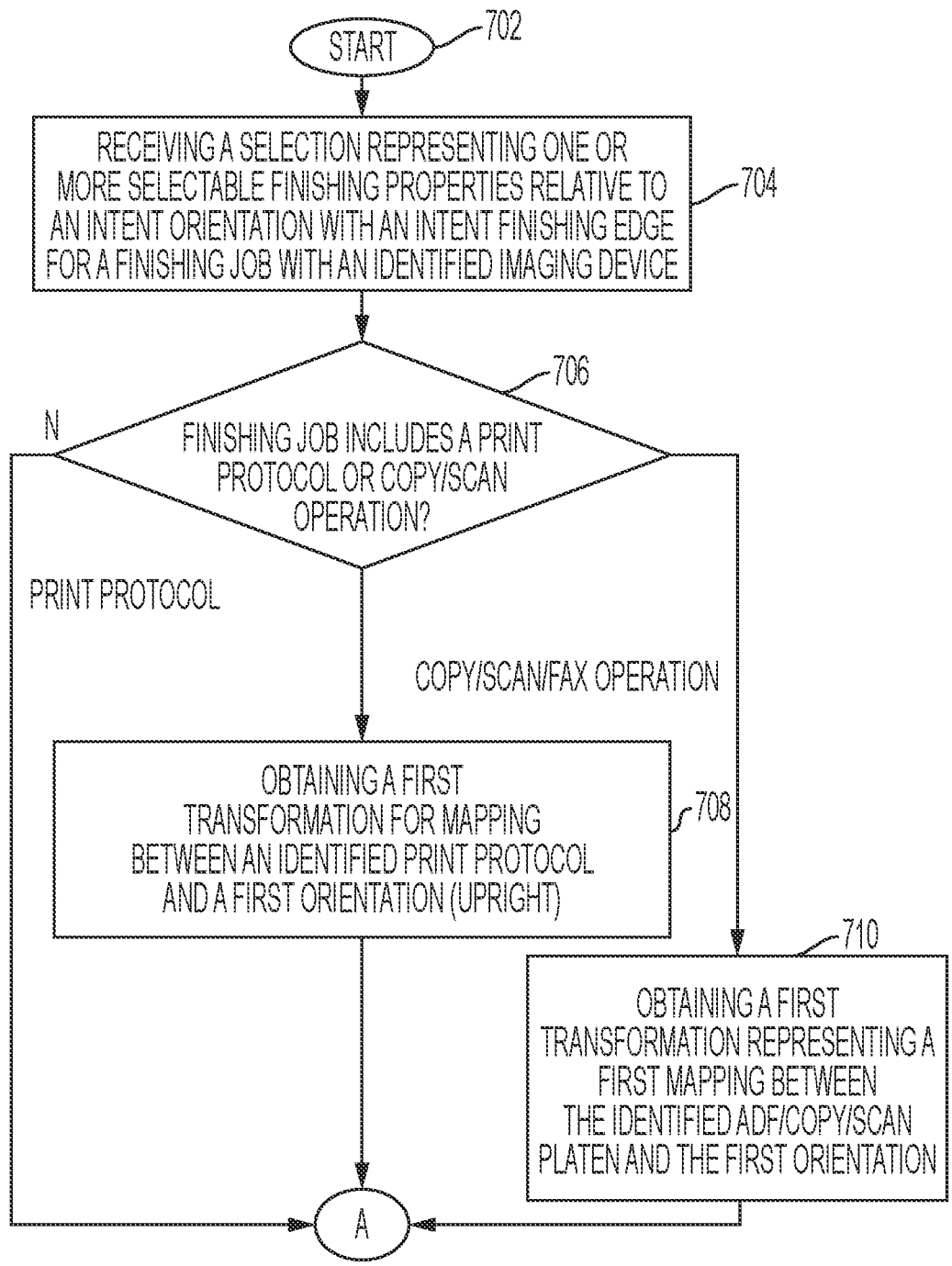
FIG. 7 thru FIG. 9 are a flow diagram illustrating a user's selection for a finishing job with one or more selectable finishing properties and the related transformations.
Figure 8:
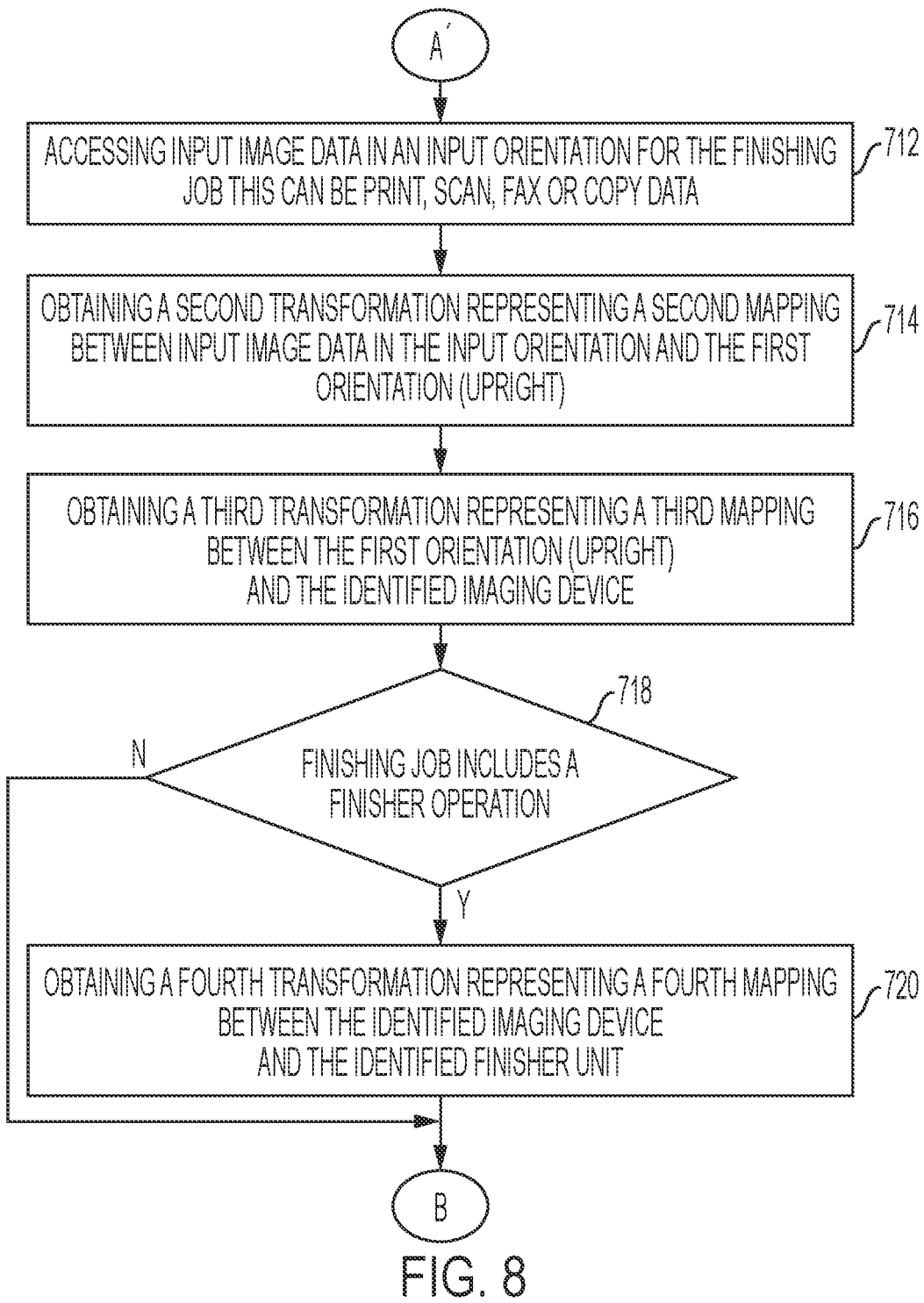
Figure 9:
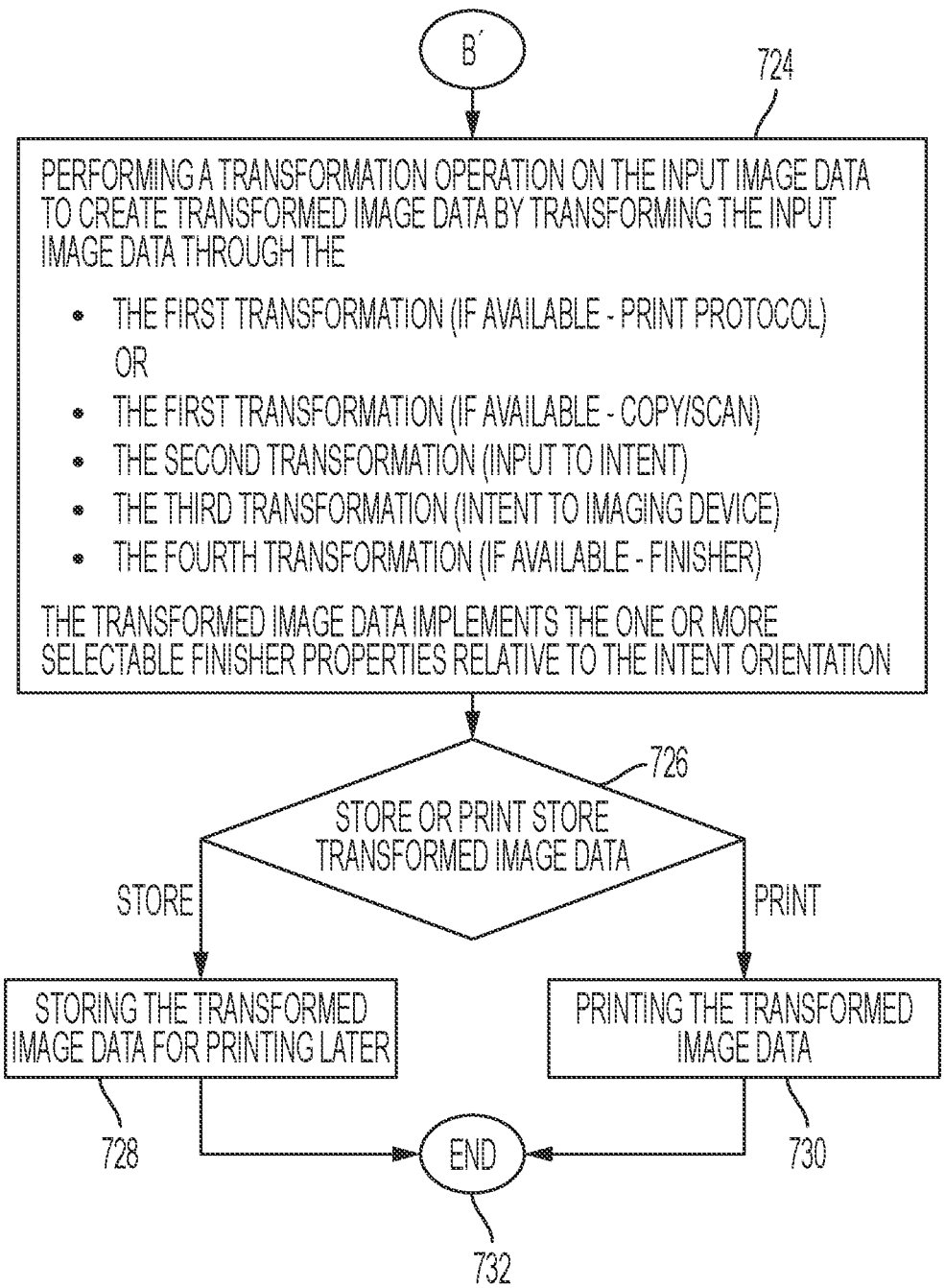

Turning now to FIG. 2, shown is a block diagram of a more detailed view of the of the major components of the multi-function machine 180 of FIG. 1 used to carry out various embodiments such as the method of FIG. 7.

Figure 6:
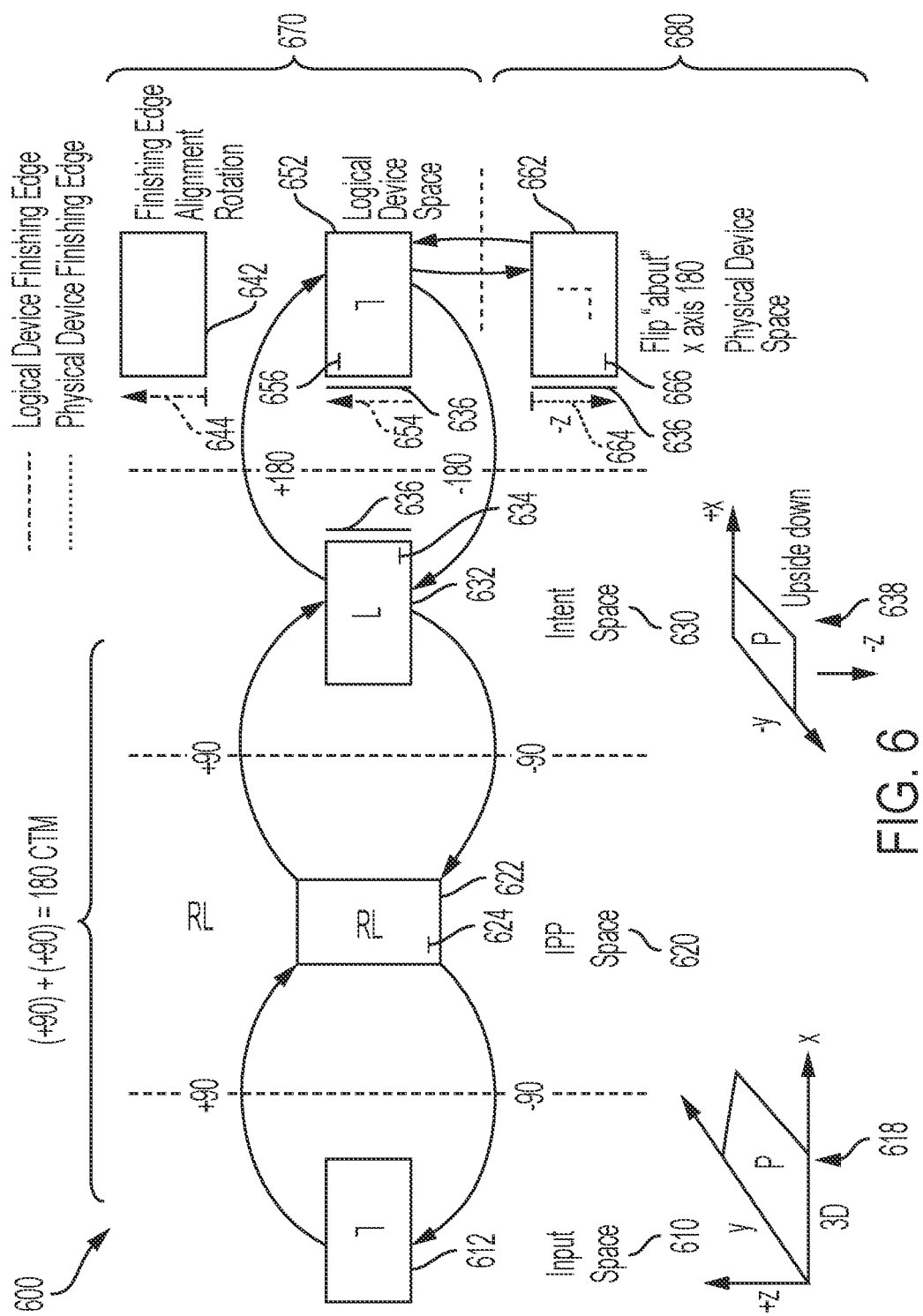
FIG. 6 is an illustration of IPP space being mapped to an Intent finishing space through to a finisher unit.

FIG. 2 is a system diagram of the imaging device used to carry out the method of FIG. 6, according to an embodiment hereof, illustrating an example image path for printing, scanning, copying or a combination of each of these operations in an imaging device 200. Imaging operations are performed across possibly different sub-systems within an imaging device, such as a printer, multifunction device, scanner, fax, copier or other systems and devices. The manipulations include the image transformations of user Intent space to device or subsystem space.

There are two types of set-up for a system: job-level setup and device level setup also known as system-level setup. Policies and/or imaging device system configurations are used to emulate the same job-ticket across a variety of imaging systems. Job-level is on a per job basis. Using job-level setup, such as through UI Level Transformations and policies could be set to emulate a certain manufacturer's machine. This would make a job portable across different manufacturer's imaging devices. On the other hand, device-level setup changes the device for all jobs.

The imaging device 200 in accordance with one or more aspects of the present disclosure, comprises one or more Raster Image Processor(s) (RIPs) and/or scan processor(s) 204 associated with an image buffer manager 206 communicatively coupled to a print engine(s) 250 that print images on a printable media or imagable substrate 260 introduced thereto. For scanning or copying or faxing operations, the job may not be printed but rather put in an imaging buffer manager 206 for later use such as e-mail, local or remote storage, and more non-printing functions. The term "scanning" is used in this description to mean scanning, copying or faxing.

The imaging device includes a digital front end 202 (DFE) having calculation control 230 for selecting and applying the transformations to the image data described herein. The calculation control 230 can control multiple levels and subsystems including raster image processors and or scan processors 204, image processor(s) 220, marking subsystems 222 and finisher 270 a shown/selections.

The transformation are applied on images data over one or more sub-systems of RIPs and/or scan processor(s) 204, one or more image processor(s) 220 and print engine(s) 250 according to the present invention. Although the image processor(s) 220 are shown outside the DFE 202, in this embodiment, in other embodiments the image processor(s) 220 are inside the DFE 202. The transformations include UI Level Transformation such as rotations for finishing edges as described in this patent and/or Device Level Transformation of as scaling, translation, reflection, and rotation as described in earlier work. The DFE 202 may include additional RIP instances (not shown), such as a PostScript RIP, a PCL RIP, etc., wherein each RIP instance is operatively coupled with corresponding multiple imagers.

The transformed image data is "print ready", i.e., ready for the finisher unit. The transformed image data is either stored in storage 280 for printing later or immediately sent to the print marking engine 250 for immediate printing. Other types of exporting transformed image data can be performed. For example storage 282 including internal, external, cloud storage, and transmission through fax and email are also supported.

Furthermore, a single print job may be processed by two or more RIP instances of the same type (e.g., page parallel RIP). The print engine(s) 250 may include separate color and monochrome engines that work cooperatively under the control of more than one image processor(s) 220. For example, many times different image processors are used to perform separate tasks, e.g., translation/rotate and another to perform compression, although not a requirement of the disclosure. In another possible implementation, for example, two or more color imagers could be provided with a single component RIP and/or scan processor(s) 204 in a DFE 202, where one of the imagers is associated with a print engine having a lower print cost than a print engine associated with the other imager. Still another possible example includes two or more monochrome imagers associated with print engines having different associated print costs. The imaging device 200, moreover, can have a modular architecture that allows print engine(s) 250 to be interchanged with other print engines, wherein some engines may be adapted to produce color printed images while others may be limited to monochrome imaging. The DFE 202 includes an image buffer manager 206 for managing output from the RIPs and/or scan processor(s) 204 being fed into the print engine(s) 250. Although the image processor(s) 220 is shown as part of the imaging device 200, it is important to note that the image processor(s) 220 may be in multiple places within the image path and/or divided into more than one image processor. Image processor(s) may be utilized, for example, to aid in the rendering part of RIP (in-RIP), post-RIP when reprinting, and in the print engine(s) 250.

The calculation control 230, in one embodiment, stores imaging operation information to different imagable sub-strates e.g. different sheet sizes, different sheet weight, and other system/printer/scanner/copier/multifunction device variables including sheet feeding trays and finishing devices. Also, the imaging operation information can include path-ways through the system, for example different sized papers, or trays, transported through the system as simplex or duplex and being sent to various output trays, finishers, and staplers. The calculation control 230 can be applied at different sub-systems in the imaging system 200 as further described below. The print engine(s) 250 may be any device or marking apparatus for applying an image from the DFE 202 to printable substrate (print media) 260 such as a physical sheet of paper, plastic, or other suitable physical media substrate for images, whether precut or web fed. The print engine(s) 250 generally includes hardware elements employed in the creation of desired images by xerographic processes and may also include ink-jet printers, such as solid ink printers, thermal head printers that are used in conjunction with heat sensitive paper, and other devices capable of printing an image on a imagable substrate 260.

The DFE 202 can be any suitable hardware, software, or combinations thereof, whether a unitary system or a plurality of systems implementing the front end functionality in distributed form to provide an interface between submitting host 210 providing job ticket(s) 214 through imaging job programming 216 connected to a User Interface ("UI") 218 as part of the DFE 202. In another embodiment the host 210 provides incoming imaging job(s) 212 to the print engine(s) 250 in the print path or scan processors 204 in the scan path. In one embodiment, the print path for the imaging device 200 can be any form of commercial printing apparatus, copier, printer, scanner, fax machine, or any other printing system with one or more print engine(s) 250 by which visual images, graphics, text, etc. are printed on a page or other printable medium 260, including xerographic, electro pho-tographic, and other types of printing technology, wherein such components are not specifically illustrated to avoid obscuring the various alternate imaging features of the present disclosure.

FIG. 2 includes a job queue 208 having various hardware memory, disk drives, or other storage apparatus by which one or more incoming print/scan/copy/fax, i.e., MFD jobs 212 can be received from a computer or other host 210 and stored, in whole or in part, for processing by a RIPs and/or scan processor(s) 204. The scan or copy can be local or remote to imaging device 200. The scan/copy typically produces a raw proprietary raster image. Using a function such as scan to USB drive, for example, the raw proprietary raster image format is converted into industry standard formats such as PDF or TIFF. The print path can consume PDLs that get RIPped into internal raster images until exported into an industry format such as PDF or TIFF For example, the image job 212 may be generically PDL or specifically PDF in the case of printing. Likewise, in the case of scanning or copying, the imaging job 212 may be PDF or TIFF. In one embodiment, the RIPs and/or scan processor(s) 204 operates in concert with the queue 208 to process incoming print jobs 212 to thereby create RIPped or scanned objects, which are stored in an image buffer manager 206 of the DFE 202. Calculation Control 230 provides image operations of user and/or device translation, rotation, reflection and scaling using one or more transformations at various sub-systems within imaging device 200. This invention uses the notion of (vector) spaces and transformations in a mathematically formal way. Earlier inventions employed a mix of within-space and across-space transformations. For example, user-oriented imaging operations such as rotation, scaling, and translation are within-space imaging transformations. Alternatively, making these operations work consistently via device emulation requires additional across-space transformations. An important distinction is the notion of user specified imaging functions in the present invention as contrasted with system or device specified imaging functions. The transformations in the present invention are primarily across-space, most specifically relating to 3D rotations required by a particular device system configuration. Typically rotations are in 2D (user) and/or 3D (system/device). Now, following earlier work approaches, the present invention provides a solution for composite matrix operations both within-space and across-space rotations seamlessly. Both of these two different operations are composited. The system rotation maps from e.g. IPP space to Intent space to Device space. Both these rotations operate inside this Calculation Control 230 sub-system.

While the use of standard 2D and 3D affine rotation matrices found in computer graphics is exemplary, other rotation mechanisms are viable. For example, rotation via quaternions.

In one embodiment, imaging jobs commonly RIPped/scanned into the image buffer manager 206 are processed by image processor(s) 220 to manipulate raster page images for use by print engine(s) 250. In the print engine, a printable substrate registration sub-system 252 aligns the printable substrate 260 for image formation on xerographic sub-system(s) 254.

Imaging device 200 can receive job programming 216 at the user application level. For example, a job may include rotating an image by 90, 180, or 270 degrees, scaling up or down the image, or translating/shifting the image in one or more directions. Job programming 216 is handled by RIPs and/or scan processor(s) 204 or at image processor(s) 220. For example, during or after RIP or scan a translation and/or rotation is performed according to the user application in order to accommodate a printable substrate 260 with 3-holes punched along one side.

Using the present invention the imaging device 200 can be setup to emulate a certain manufacturers' hardware for every job. This emulation allows all jobs originally created for one manufacturer's hardware to be run on a different manufacturer's hardware while producing the same results. This makes a job portable across different manufacturer's imaging devices. For example, if an operator or company is familiar with jobs created for a specific hardware model, the present invention allows this job to run these model-specific jobs and through emulation by automatically reordering the job to run.

Internet Printing Protocol (IPP) Examples

Figure 3:
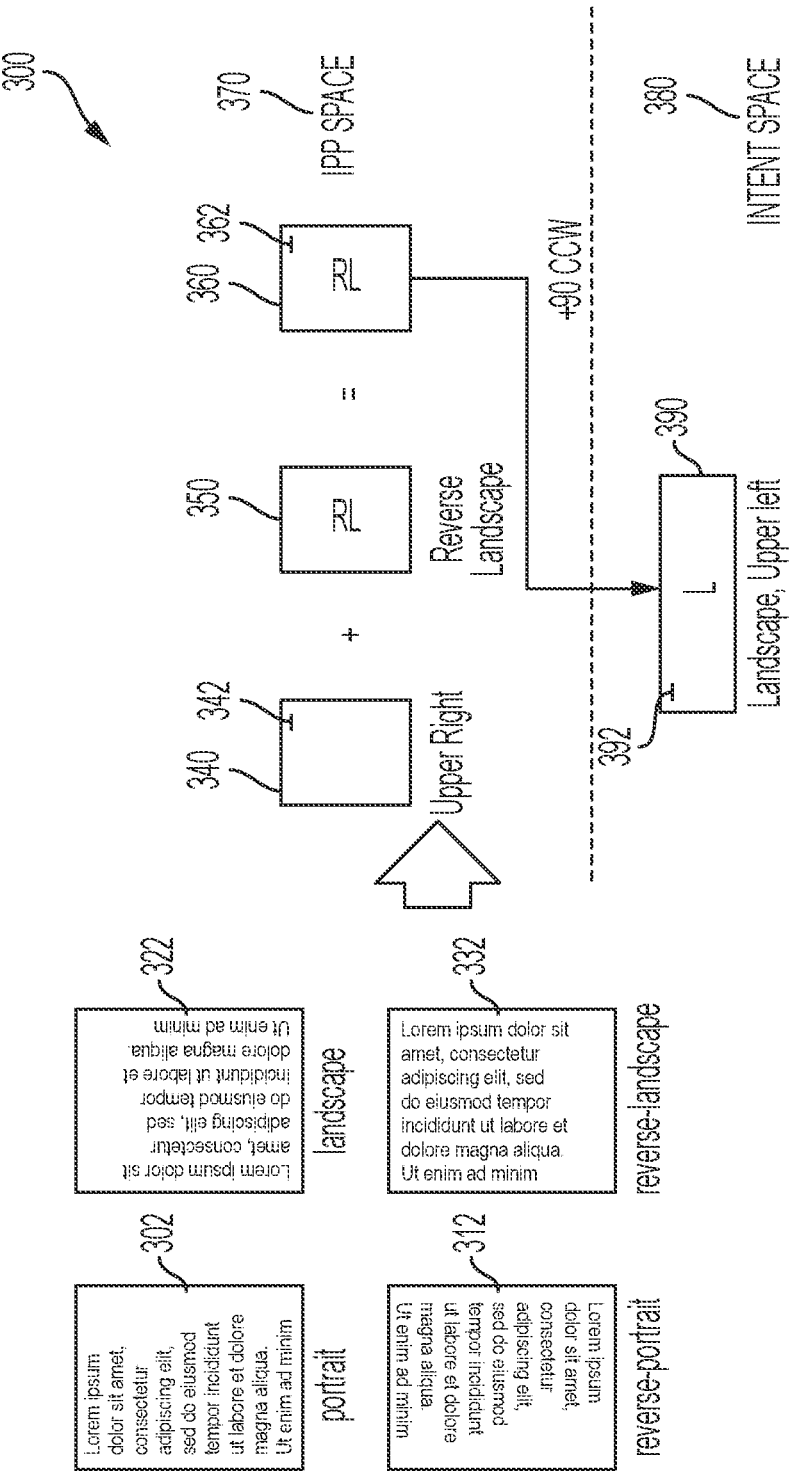
FIG. 3 is an example printer protocol convention, specifically the Internet Print Protocol (IPP) convention, and a user specifying an Intent finishing edge for a print job.

The present method and system accommodates the differences in various communication protocols between client devices (computers, smartphone, tablets, etc.) and printers. Turning now to FIG. 3, shown is an example printer protocol convention, specifically the industry standard internet print protocol (IPP) convention 300, and a user specifying an Intent finishing edge for a print job. Additional information on IPP is found at online URL <https://ftp.pwg.org/pub/pwg/candidates/cs-ippfinishings20-20141219-5100.1.pdf>.

For example, IPP is used with varying levels of support by Apple AirPrint, Mopria, and Xerox print drivers. Starting with the left-side, shown are the four orientations of IPP. The first is a portrait orientation 302. The second is a reverse portrait orientation 312. The third is a landscape portrait orientation 322. And the fourth is a reverse landscape portrait orientation 332.

Shown are two finishing spaces. The first space is an Intent space 380 i.e. a user's Intent orientation. The second space is the IPP space 370. The user wants or "intends" a landscape output 390 with a staple in the top left corner 392. To achieve the user's Intent orientation and Intent finishing edge, this requires in the IPP space 370 a requires a reverse landscape 360 with a upper right staple 362. Stated differently in IPP Space 370 a staple in upper right 362 must be used with reverse landscape 350 to achieve the output as desired by the user. Then the output must be rotated 90 degrees counter clockwise (or 270 clockwise).

Note since this is a single staple in a corner, there are two IPP orientations that could be used by each of the edges that intersect to form the corner. The first IPP orientation is a reverse landscape 360 plus the staple in the upper right 362 as shown. The second IPP orientation is a landscape 322 with a staple on the top right (not show). The possibility of selecting one of two edges is further discussed in FIG. 5 below.

When there are two originations that can be used to map to the Intent finishing edge, the imaging system could dynamically select which of the two rotations to use. This selection can be based on which paper paths are busy or sub-systems of an imaging system can be used. Moreover, in another example jobs can process in parallel. For example if the system has two loaded imagable substrate orientations the system can use both orientations. Meaning, one job can use the LEF loaded paper, the other SEF loaded paper, and still get a single staple in a corner.

Forward and Inverse System Rotations for Finishing Edge

Figure 4:
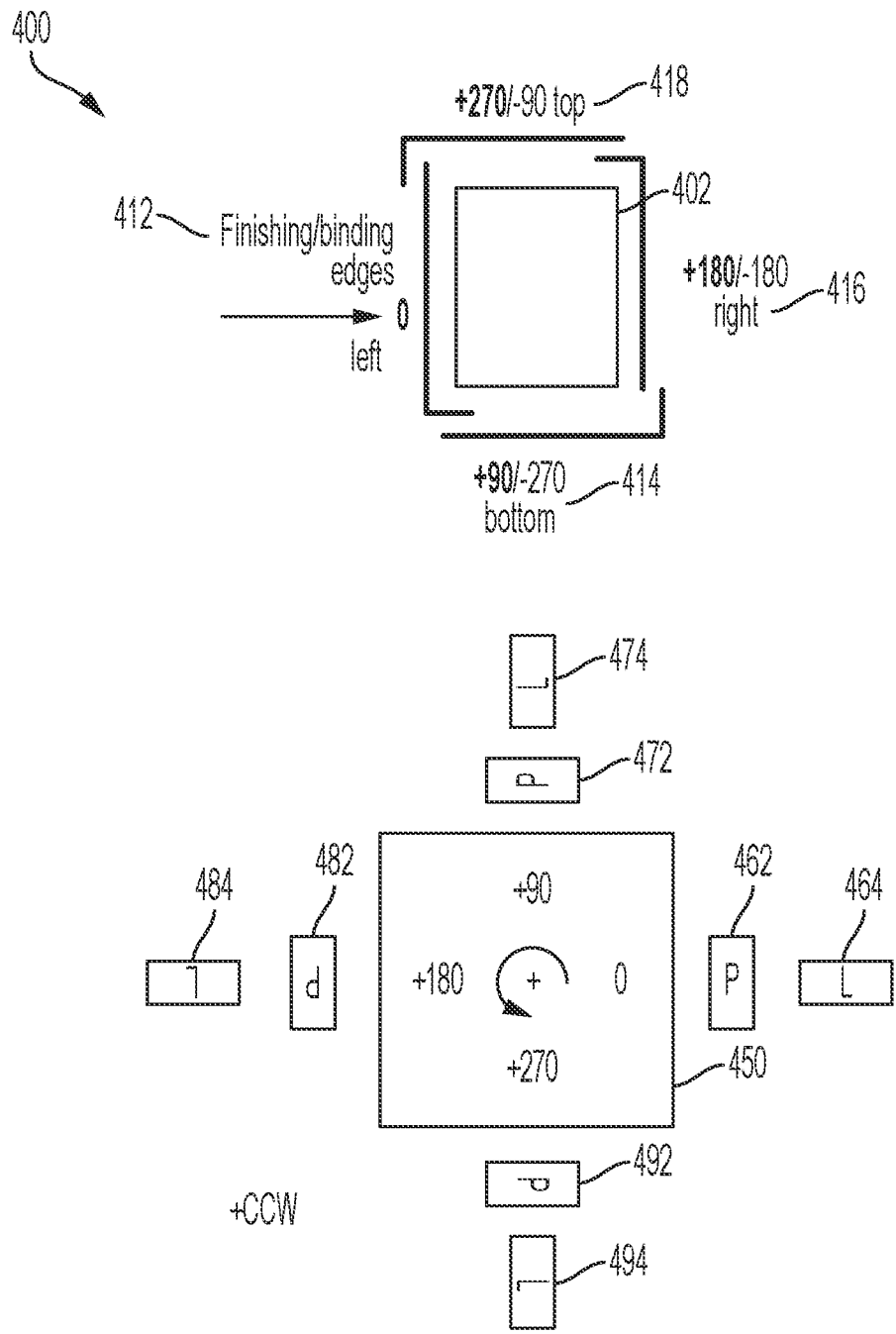
FIG. 4 is an illustration of portrait and landscape finishing edge forward and inverse rotations.

FIG. 4 is an illustration 400 of portrait and landscape finishing edge forward and inverse rotations. Shown is an imagable substrate 402 with a left finishing edge 412 (0 degree rotation), a bottom finishing edge 414 (+90/−270 degree rotation), a right finishing edge 416 (+180/−180 degree rotation), and a top imaging edge 418 (+270/−90 degree rotation).

For illustrative purposes, the left edge is arbitrarily selected to be the canonical finishing edge, which is unrotated. And the canonical orientation is Upright. Other edges are defined as a rotation from a chosen canonical finishing edge orientation. Any edge may be arbitrarily selected as a default finishing edge; there is nothing special about the left edge as a default.

Also shown is counter clockwise rotation 450 of a portrait imagable substrate 462 and landscape imagable substrate 462 through a 90 degree rotation (472, 474), a 180 rotation (482, 484) and a 270 degree rotation (492, 494).

Finishing Edge as a Rotation Matrix Representation

The rotation matrices used here are ordinary 2D and 3D affine transformations commonly found in computer graphics and adapted for finishing orientation. It should be understood that while rotation matrices are an attractive choice, other techniques such as rotation via quaternions are possible and equally applicable to this invention.

New Finishing Edge Enumeration Convention as an Ordered Pair

The present invention introduces a new convention of edge, position on edge. For example:

TopLeft is Top finishing edge, and the finishing position is Left.

LeftTop is Left finishing edge, and Top finishing position.

This compound enumeration is important in corner finishing where the position could be relative to two finishing edges. The ordered pair is {edge, position on edge}. This formalization is also helpful when mapping to traditional singular finishing position enumerations, such as found in IPP.

This is significant to handle corner finishing that have two finishing edges. Moreover industry standard enums are converted to functional abstraction, and finishing edge can be derived from this special approach. This is critical for automated enumeration of scenarios, handling corners with dual edges.

Knowing the finishing edge is critical for automated image rotations. Rotations required for device alignment are determined via rotations or linear algebraic change-of-basis. Formal modeling of finishing spaces enables correct forward and inverse mappings of image orientations and finishing positions between print protocol (IPP), Intent, and Device spaces. Note that inverse operations are sometimes referred to as reverse or backward mappings. This invention borrows from formal methods found in linear algebra and computer graphics.

Figure 5:
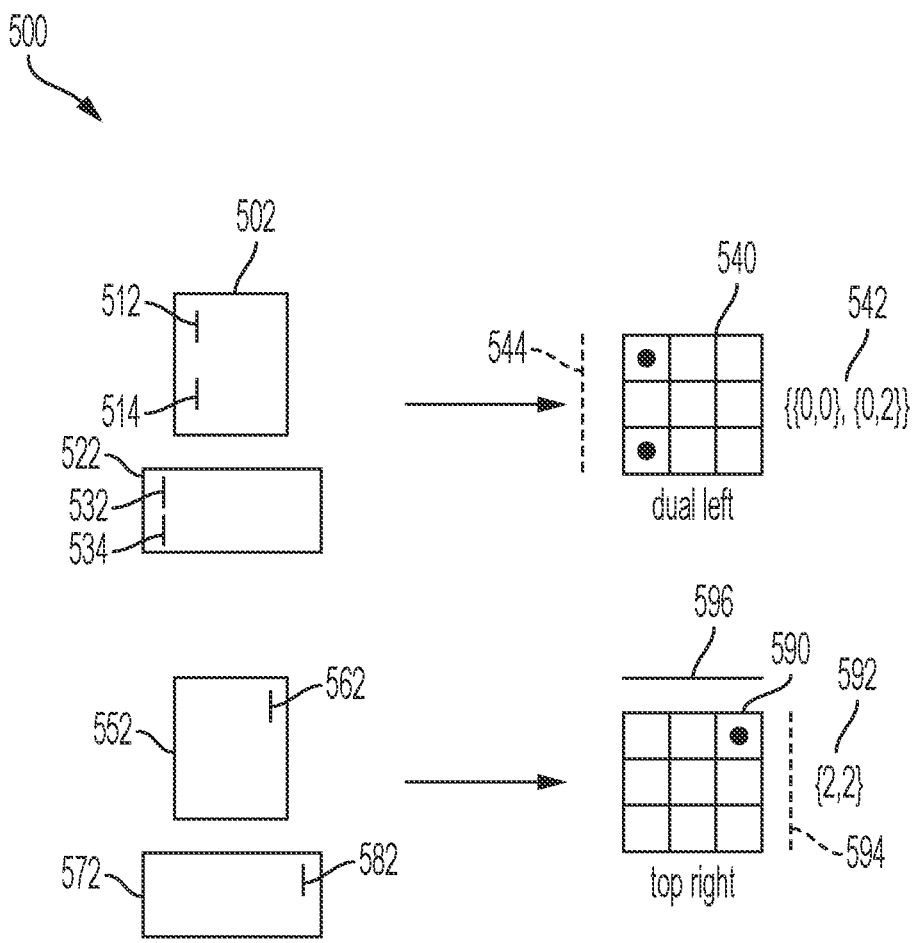
FIG. 5 is an illustration of finishing edges being represented in a matrix with a finisher unit operation.

Turning now to FIG. 5 is an illustration 500 of finishing edges being represented in a grid of cells as part of a cell coordinate system with positions represented as 2D indices with the cell space. This convention allows a finishing position to be an index into a cell space. This abstract representation allows finishing positions to be rotated in a coordinated fashion with image rotations. Since 2D cell spaces can be subsumed within a 3D framework, this convention is now extended to work with physical finishing device orientations in 3D (e.g., staple position when firing "up" or "down" into sheet). Finisher unit operations include staple operations, include hole punch operations, folding operations or cutting operations with locations being displayed. Shown are two scenarios where there is an operation that has two or more contact points on a finishing edge, such as dual staples or dual-hole punch. This is shown in portrait sheet 502 with dual-hole punch or dual staple positions 512, 514. Also shown is a landscape sheet 522 with dual punch or dual staple position 532, 534. These finishing operations are represented in a 3×3 cell grid 540 with cell indices (indexes) [(0,0), (0,2)] as abstract positional coordinates in cell space 542 with a single finishing edge 544.

A single staple or hole in a corner, such as those shown in portrait sheet 552 with staple 552 or landscape sheets 572 with staple 582. This is represented by 3×3 matrix 590 with an entry in the top right [(2,3)] 592. Note that for a single hole or a single staple in there are two finishing edges 594 and 596 as shown.

IPP Space Mapped to Intent Finishing Space Through to A Finisher Unit

FIG. 6 is an illustration 600 of IPP space being mapped to an Intent finishing space through to a finisher unit. As shown is the user desires in the Intent space 630 with a landscape orientation 632 and a staple in the bottom right corner 634 with finishing edge 636. To achieve this Intent space 630 using the IPP print protocol, in IPP space 620, a reverse landscape orientation 622 with a staple in corner 624 is required. The input space 610, such as from a user device, e.g. smartphone, computer, tablet, has, for this example, an inverted landscape or a landscape rotated 180° image orientation relative to user Intent space 630 as shown.

Note to align the finishing edge 654 of the logical device space 670 to an inverted landscape 652 with staple position 656, this requires that image must be rotated 180° from user Intent space 630 as shown. The arrow direction of leading edge 654 is a y-axis reference with a positive z-axis 3D orientation. Stated differently from input space 610, to IPP space 620, to Intent space 630, the z-axis is upward 618. However, the physical device space 680 in this example requires the staple to fired or fastened from the bottom to the top i.e. upward direction as shown in 664. This is represented by a negative z-axis in a 3D coordinate space/framework. To accomplish this alignment of the finishing edge with a negative z-axis 638, meaning the sheet and corresponding image is face down, the finishing positions must be flipped about the x-axis by 180 degrees as shown 662 with staple 666. The broken line L denotes that the image is formed on the opposite i.e. downward facing side to accommodate the negative z-axis of the staple. The upper left staple position in the logical device space stapling finisher (staple fires "down" into sheet) becomes a lower left staple position with an inverted physical device space stapling finisher (staple fires "up" into sheet).

This is an extension of earlier work where the cell space with finishing coordinates are now part of a 3D framework compared to earlier 2D usage. In other words, the cell space now has a z-axis to accommodate both face up and face down paper paths and/or sheet delivery.

Flow Diagram of User' Selection for A Finishing Job

FIG. 7 is a flow diagram illustrating a user's selection for a finishing job with one or more selectable finishing properties and the related transformations. The process starts in step 702 and immediately proceeds to step 704.

In step 704, a selection representing one or more selectable finishing properties relative to an Intent orientation with an Intent finishing edge for a finishing job with an identified imaging device is received from an end user. For example the Intent space 630 in FIG. 6 with landscape orientation 632, stapled in lower left corner 634 and leading edge 636. The process continued to step 706.

In step 706, a test is made to determine if the finishing job includes either a copy/scan/fax or export to cloud storage or email operation or a specific print protocol. In the case that the finishing job includes a print protocol, the process proceeds to step 708. In step 708, a first transformation for mapping between an identified print protocol and a first orientation (upright) is obtained from storage. The process continues to node A to drawing sheet 8 of 9.

In the case that the finishing job includes a copy/scan/fax operation, the process continues to step 710. At step 710 a first transformation representing a first mapping between the identified copy/scan platen and the first orientation is obtained from storage. The process continues to node A to drawing sheet 8 of 9.

In the case that the finishing job does not include neither a print protocol nor copy/scan/fax operation, the process continues to node A to drawing sheet 8 of 9.

Next node A' on sheet 8 of 9, which is a continuation of node A on sheet 7 of 9, flows into step 712. In step 712 input image data in an input orientation for the finishing job is accessed. This can be print, scan, fax or copy data. The process continues to step 714.

In step 714, obtaining a second transformation representing a second mapping between input image data in the input orientation and the first orientation (upright). The process continues to step 716.

In step 716, a third transformation representing a third mapping between the first orientation (upright) and the identified imaging device is retrieved from storage. The process continues to step 718.

In step 718 a test is made to determine if the finishing job includes a finishing operation. In response that the finishing job includes a finisher operation, the process continues to step 720. Otherwise, if the finishing job does not include a finishing operation, the process continues to node B.

In step 720, a fourth transformation representing a fourth mapping between the identified imaging device and the identified finisher unit is retrieved from storage and the process continues to node B.

Next node B' on sheet 9 of 9 which is a continuation of node B on sheet 8 of 9 flows into step 724. In step 724 transformation operations on the input image data are performed. More specifically, a transformation operation is performed on the input image data to create transformed image data by transforming the input image data through the the first transformation (if available—print protocol)
      OR
    the first transformation (if available—copy/scan)
    the second transformation (input to intent)
    the third transformation (Intent to imaging device)
    the fourth transformation (if available—finisher)

The transformed image data implements the one or more selectable finisher properties relative to the Intent orientation. The process flows into step 726.

In step 726 a test is made to determine if the transformed image data. i.e., print ready data, should be stored or printed. In the case of the storing the process continues to step 728 in which the transformed image data is stored for printing later. Note in one example this transformed data could be for the imaging system performing these transformation operations. In another example this transformed image data for a machine being emulated. The process ends in step 732.

Otherwise, in the case of printing, the process continues to step 730 in which the transformed image data is sent to the marking engines of the printer and the process ends in step 732.

Mathematica Example

The present method and system has been modeled using Mathematica by Wolfram Research, Inc. of Champaign, Ill.

It is important to note that rotations can be either clockwise (CW) or counter clockwise (CCW), and the choice is arbitrary but rotation operations and matrices must be correctly chosen. Similarly, graphics operations can operate on data stored in matrix form that are either row-wise or column-wise and care must be taken as to convention selected. Also, the matrix algebra tool here uses the dot operator "." to signify matrix multiplication.

Finishing edges are defined as rotation matrices per earlier convention. The default/canonical orientation is upright and unrotated. This approach allows us to discover rotations via matrix math. In one example a finisher device with a stapler in the imaging process system fires in the upward direction. For this particular example, the image on the sheet is "face down", relative to Intent orientation that is "face up", the sheet here is inverted, or rotated in 3D about the x-axis. The 2D space is a subset of 3D space. For mathematical consistency, the present invention is implemented in 3D space even for 2D image rotation operations. In these examples the sheet in canonical "face up" orientation is represented with a positive +z direction, and only invert to −z direction when required for physical orientation, e.g. upward staple function.

This example show a mapping between three perspectives represented by four spaces as follows: 1) "IPP space, 2) "Intent space", 3) "device space", and 4) "finishing index" space. The present invention formalizes finishing perspectives as mathematical spaces in a novel way. The finishing operation is often confused due to multiple meanings of spaces i.e., "overloaded spaces" that have now been "factored". The device space is further split into a logical device space and a physical device space.

$$leftFinishingEdge = zRotate3D[0 Degree]$$
$$\begin{pmatrix} 1 & 0 & 0 & 0 \\ 0 & 1 & 0 & 0 \\ 0 & 0 & 1 & 0 \\ 0 & 0 & 0 & 1 \end{pmatrix}$$

$$topFinishingEdge = zRotate3D[270 Degree]$$
$$\begin{pmatrix} 0 & 1 & 0 & 0 \\ -1 & 0 & 0 & 0 \\ 0 & 0 & 1 & 0 \\ 0 & 0 & 0 & 1 \end{pmatrix}$$

$$rightFinishingEdge = zRotate3D[180 Degree]$$
$$\begin{pmatrix} -1 & 0 & 0 & 0 \\ 0 & -1 & 0 & 0 \\ 0 & 0 & 1 & 0 \\ 0 & 0 & 0 & 1 \end{pmatrix}$$

$$bottomFinishingEdge = zRotate3D[90 Degree]$$
$$\begin{pmatrix} 0 & -1 & 0 & 0 \\ 1 & 0 & 0 & 0 \\ 0 & 0 & 1 & 0 \\ 0 & 0 & 0 & 1 \end{pmatrix}$$

Above are all really 4×4 rotation matrices in 3D (standard computer graphics form. The leading letter {x,y,z} represent the axis of rotation.). By arbitrary choice, positive rotation is CCW.

Beginning with a landscape image, whose input orientation is upside down (180). Whether RIPped or scanned in. It is the starting image orientation of the process. A CTM is a Composite Transformation Matrix as described in the previous work, which has been incorporated by reference. The CTM may also be a Current Transformation Matrix which keeps track of current state by being updated along the scan/copy path or print path. In this invention, the CTM is used it in the latter sense to keep track of rotations applied.

$$imageOrientationCTM = zRotate3D[180 Degree]$$
$$\begin{pmatrix} -1 & 0 & 0 & 0 \\ 0 & -1 & 0 & 0 \\ 0 & 0 & -1 & 0 \\ 0 & 0 & 0 & -1 \end{pmatrix}$$

IPP orientations are also defined as rotation matrices. Think of orientations as behaving as a duality with rotations/reflections. Although the present invention does not require reflections, they are equally important and the duality applies to reflections as well.

$$portraitIPPTransform = zRotate3D[0 Degree]$$
$$\begin{pmatrix} 1 & 0 & 0 & 0 \\ 0 & 1 & 0 & 0 \\ 0 & 0 & 1 & 0 \\ 0 & 0 & 0 & 1 \end{pmatrix}$$

$$reversePortraitIPPTransform = zRotate3D[180 Degree]$$
$$\begin{pmatrix} -1 & 0 & 0 & 0 \\ 0 & -1 & 0 & 0 \\ 0 & 0 & 1 & 0 \\ 0 & 0 & 0 & 1 \end{pmatrix}$$

$$landscapeIPPTransform = zRotate3D[+90 Degree]$$
$$\begin{pmatrix} 0 & -1 & 0 & 0 \\ 1 & 0 & 0 & 0 \\ 0 & 0 & 1 & 0 \\ 0 & 0 & 0 & 1 \end{pmatrix}$$

$$reverseLandscapeIPPTransform = zRotate3D[-90 Degree]$$
$$\begin{pmatrix} 0 & 1 & 0 & 0 \\ -1 & 0 & 0 & 0 \\ 0 & 0 & 1 & 0 \\ 0 & 0 & 0 & 1 \end{pmatrix}$$

The following employs a simple but important technique to discover or identify rotations. More specifically, when working with two orientations, the math determines the rotation between them. This technique also works with reflections.

Revisiting the upside down 180 starting image, and discover what rotation is needed to have it be in IPP reverse landscape orientation. Important to note that before any actual image rotation is performed, the set of rotations are identified and realized in the CTM. Only one current transformation matrix (CTM) is applied for a rotation of the image data at the end. Note that a CTM could be applied at each step or point along the way. However, doing it only once with the CTM is typically more ideal. The step-wise approach may be appropriate in other circumstances like debugging code and seeing the image rotations at each step. Both of these approaches are valid and within the true scope of the present invention.

$$reverseLandscapeIPPTransform \cdot Inverse[imageOrientationCTM]$$

$$\begin{pmatrix} 0 & -1 & 0 & 0 \\ 1 & 0 & 0 & 0 \\ 0 & 0 & 1 & 0 \\ 0 & 0 & 0 & 1 \end{pmatrix}$$

$$zRotate3D[+90\text{Degree}]$$

$$\begin{pmatrix} 0 & -1 & 0 & 0 \\ 1 & 0 & 0 & 0 \\ 0 & 0 & 1 & 0 \\ 0 & 0 & 0 & 1 \end{pmatrix}$$

The Inverse[ ] here is a standard matrix inverse function that works on both 2D and 3D matrices.

The solutions today require that various orientation enums be tracked and mapped between various incoherent conventions. Programming techniques typically involving extensive use if/then/else or case statement logic to manage various orientations are required. In contrast, the present invention uses two orientation matrices and with a simple command, finds or identifies the rotation needed. For example, from an upside-down image to a reverse landscape in IPP orientation, a +90 degree rotation is needed. As can been seen the discovered matrix is identical to a 90-degree rotation (+=CCW direction). This is important to be able to formally (mathematically) specify finishing in confusing print protocols, such as the IPP convention. Today's enumerations are descriptive, not functional, lacking a common computational framework to normalize positional representation approaches and mappings between differing finishing perspectives.

A quick check of the work. The rotation to the original upside down 180 orientation is applied, and this aligns to reverse landscape orientation. This is doing a forward transformation. Although forward transformations are used in computer graphics, in the present invention is it applied in a new way for orientations.

$$reverseLandscapeIPPTransform$$

$$\begin{pmatrix} 0 & 1 & 0 & 0 \\ -1 & 0 & 0 & 0 \\ 0 & 0 & 1 & 0 \\ 0 & 0 & 0 & 1 \end{pmatrix}$$

$$imageOrientationCTM$$

$$\begin{pmatrix} -1 & 0 & 0 & 0 \\ 0 & -1 & 0 & 0 \\ 0 & 0 & 1 & 0 \\ 0 & 0 & 0 & 1 \end{pmatrix}$$

$$imageToIPPTransform =$$

$$reverseLandscapeIPPTransform \cdot Inverse[imageOrientationCTM]$$

$$\begin{pmatrix} 0 & -1 & 0 & 0 \\ 1 & 0 & 0 & 0 \\ 0 & 0 & 1 & 0 \\ 0 & 0 & 0 & 1 \end{pmatrix}$$

The above is equivalent to a +90 degree rotation, which would take an upside down image at 180 degrees, and rotate +90 degrees to bring it to a reverse landscape orientation.

$$zRotate3D[+90\text{Degree}]$$

$$\begin{pmatrix} 0 & -1 & 0 & 0 \\ 1 & 0 & 0 & 0 \\ 0 & 0 & 1 & 0 \\ 0 & 0 & 0 & 1 \end{pmatrix}$$

$$imageToIPPTransform \cdot imageOrientationCTM$$

$$\begin{pmatrix} 0 & 1 & 0 & 0 \\ -1 & 0 & 0 & 0 \\ 0 & 0 & 1 & 0 \\ 0 & 0 & 0 & 1 \end{pmatrix}$$

To further show how using computer graphics rotations "composite" or add up, the 180+90 degrees should be equivalent to a 270 degree rotation.

$$zRotate3D[+270\text{Degree}]$$

$$\begin{pmatrix} 0 & 1 & 0 & 0 \\ 1 & 0 & 0 & 0 \\ 0 & 0 & 1 & 0 \\ 0 & 0 & 0 & 1 \end{pmatrix}$$

The above shows the goal orientation of reverse landscape, the starting orientation of 180 (upside down), the calculation of the rotation required to go from starting→desired orientation, and the application of the rotation to the starting orientation to show that it indeed rotates to the reverse landscape orientation.

The last operation applies the rotation needed to put the upside down 180 image into IPP reverse landscape orientation, and is equivalent to the −90 rotation for that reverse landscape (RL) orientation. imageToIPPTransform is a +90 rotation matrix. So to take any input orientation {0,90,180, 270} to some IPP orientation, the rotation is easily discovered the same way. Here we are generally showing singular examples. By enumerating scenario lists, nested lists may be used to generate all combinations programmatically, correctly, or to identify infeasible scenarios.

Since a CTM used in the "current" sense is used to keep track of orientation (reflection works too, but here in the present invention the focus is rotations), the CTM is updated (indicates the new logical orientation is reverse landscape):

$$imageOrientationCTM = imageToIPPTransform \cdot imageOrientationCTM$$

$$\begin{pmatrix} 0 & 1 & 0 & 0 \\ 1 & 0 & 0 & 0 \\ 0 & 0 & 1 & 0 \\ 0 & 0 & 0 & 1 \end{pmatrix}$$

Next, is discussed mapping from IPP space to Intent space. IPP finishing positions are also added and mapped to Intent space. It is important to find the image alignment rotation, and apply the same rotation to finishing positions, using prior patent techniques.

The orientation mapping from IPP to Intent spaces is similar and simpler than before. In intent space, as held/read by user, the orientation is upright. The rotation is zero. This is a special case. The orientation matrices shown in multiple examples form a "group", in a Group Theory sense. As part of a group, they have an Identity Matrix, whose inverse is the same. For the group in the present invention, closed under the operations of rotation/reflection in 2D/3D space, the Identity Matrix is equivalent to a zero rotation matrix. Multiplying or inverting by the Identity Matrix doesn't change a matrix.

To discover the rotation from IPP to Intent space the following is used, for this example:

$$\text{Inverse}[zRotate3D[0Degree]]$$

$$\begin{pmatrix} 1 & 0 & 0 & 0 \\ 0 & 1 & 0 & 0 \\ 0 & 0 & 1 & 0 \\ 0 & 0 & 0 & 1 \end{pmatrix}$$

$$zRotate3D[0] \cdot \text{Inverse}[imageOrientationCTM]$$

$$\begin{pmatrix} 0 & -1 & 0 & 0 \\ 1 & 0 & 0 & 0 \\ 0 & 0 & 1 & 0 \\ 0 & 0 & 0 & 1 \end{pmatrix}$$

$$\text{Inverse}[imageOrientaionCTM]$$

$$\begin{pmatrix} 0 & -1 & 0 & 0 \\ 1 & 0 & 0 & 0 \\ 0 & 0 & 1 & 0 \\ 0 & 0 & 0 & 1 \end{pmatrix}$$

The simplification is that, by convention, since the upright orientation is a zero rotation, which is equivalent to an Identity Matrix, it is the same as simply taking the inverse.

The rotation from IPP reverse landscape to upright in Intent space is equivalent to another +90 degree rotation:

$$zRotate3D[+90Degree]$$

$$\begin{pmatrix} 0 & -1 & 0 & 0 \\ 1 & 0 & 0 & 0 \\ 0 & 0 & 1 & 0 \\ 0 & 0 & 0 & 1 \end{pmatrix}$$

In summary, the process started with the original upside down 180 image, rotated it +90 to be in IPP reverse landscape orientation. Now, to go from the IPP orientation to upright in Intent space another +90 rotation is required. Since another rotation is added, the CTM must be updated:

$$imageOrientationCTM =$$

$$\text{Inverse}[imageOrientationCTM] \cdot imageOrientationCTM$$

$$\begin{pmatrix} 1 & 0 & 0 & 0 \\ 0 & 1 & 0 & 0 \\ 0 & 0 & 1 & 0 \\ 0 & 0 & 0 & 1 \end{pmatrix}$$

Here is becomes clear that the orientation is unrotated, which by convention is upright in Intent space. We have mapped from the original starting orientation, to IPP reverse landscape orientation, and then mapped between IPP and Intent spaces. Note again that this kind of mapping is a between-space mapping.

The current state in intent space is upright after the two +90 rotations, as desired. There are cases that mapping thru IPP is not required. One case is in Copy/Scan images. In this case, just mapping directly from original 180, requires an inverse, which is equivalent to 180. There are two paths: 1) image (some orientation)→IPP→Intent or 2) image→Intent (upright).

Upside down/180 rotation $$zRotate3D[180\ Degree]$$

$$\begin{pmatrix} -1 & 0 & 0 & 0 \\ 0 & -1 & 0 & 0 \\ 0 & 0 & 1 & 0 \\ 0 & 0 & 0 & 1 \end{pmatrix}$$

Rotation needed to make it upright in Intent space $$\text{Inverse}[zRotate3D[180\ Degree]]$$

$$\begin{pmatrix} -1 & 0 & 0 & 0 \\ 0 & -1 & 0 & 0 \\ 0 & 0 & 1 & 0 \\ 0 & 0 & 0 & 1 \end{pmatrix}$$

The following is the result after multiplication. Which is equal to zero rotation/upright orientation.

$$\text{Inverse}[zRotate3D[180\ Degree]] \cdot zRotate3D[180\ Degree]$$

$$\begin{pmatrix} 1 & 0 & 0 & 0 \\ 0 & 1 & 0 & 0 \\ 0 & 0 & 1 & 0 \\ 0 & 0 & 0 & 1 \end{pmatrix}$$

This shows it is possible to go direct to Intent space in a single operation without an intermediate mapping via IPP. In this case, from the original upside down 180 image orientation to upright in Intent space in a single step IPP finishing convention/positions can be confusing. By decoupling into IPP versus Intent spaces, and leveraging earlier finishing position techniques, based on "finishing index spaces", things are greatly simplified. There is another kind of duality at play that comes out with these investigations.

Determine image rotation needed, then apply this rotation to finishing index positions/edges OR Determine a finishing edge rotation, then apply this rotation to the image The difference is also due to forward and inverse paths taken, between spaces. This includes multiple composite mappings between multiple spaces. Mappings can occur both within-space, as described in the previous incorporated reference which is typical. This present invention exposes the need to map finishing positions and image orientations across-spaces. Referring to rotating a graphical object, this is typically within space. In contrast mapping from visual to device spaces, e.g. vector based to raster/device/imaging, that may involve across/between space mappings.

The following function maps a finishing position (index set) from one space to another, by determining the rotation needed automatically from two orientations.
rotateIndexSetSourceToTargetOrientation3D[indexSet3D_, sourceOrientation3D_, targetOrientation3D_]:=
Block[
{cIndexSet, rotation3D, targetIndexSet},
 (* Center index set within cell/grid space *)
   cIndexSet=centerRegisterIndex3D. Transpose! indexSet3D];
 (* Determine rotation needed to map from source to target spaces *) rotation3D=targetOrientation3D. Inverse [sourceOrientation3D];
 (* Determine rotation matrix *)
 (* Apply rotation, then decenter. And print out *)
 targetIndexSet=Transpose[cornerRegisterindex3D.
   rotation3D.
 cIndexSet];
 Return[{rotation3D, targetIndexSet}];
]

Running the example with an upper left finishing position (these are all mappable to IPP enums, not shown), starting in an IPP reverse landscape orientation, and mapping to the upright Intent space (no rotation). It returns the automatically calculated rotation needed, based on source/IPP and target/Intent orientations, and the new finishing positions in Intent space.
(finishingOrientationCTM, intentfinishingIndexSet)=
rotateIndexSetSourceToTargetOrientation3D[
  finishingIndexSetSingleLeftTop, (* finishing index set in IPP space *)
  reverseLandscapeIPPTransform, (* image orientation in IPP space *)
  zRotate3D[0 Degree] (* image orientation in Intent space. Unrotated is Upright *)]
{{{0,−1,0,0}, {1,0,0,0}, {0,0,1,0}, {0,0,0,1}}, {{0,0,0,1}}}

The following explains the rotations and new finishing positions. The first element of the return pair is the rotation matrix. This is the rotation matrix applied to the finishing position. Apply a rotation to make image upright, and same rotation is applied to finishing position.

$$finishingOrientationCTM$$

$$\begin{pmatrix} 0 & -1 & 0 & 0 \\ 1 & 0 & 0 & 0 \\ 0 & 0 & 1 & 0 \\ 0 & 0 & 0 & 1 \end{pmatrix}$$

The second element is the new finishing position.
(*
In IPP space the finishing position is finishingIndexSetSingleLeftTop.

This identifies or discovers what the finishing position is in Intent space.

This example confirms that it correctly went from upper left finishing position, to lower left.
*)
getFinishingIndexSetsAll[intentfinishingIndexSet]
{{finishingIndexSetSingleLeftBottom,{{0,0,0,1}}}, {finishinIndexSetSingleBottomLeft,{{0,0,0,1}}}}
finishingIndexSetSingleLeftTop
{{0,2,0,1}}
finishingIndexSetSingleLeftBottom
{{0,0,0,1}}

This invention introduces a new built-in finishing/binding edge convention. LeftBottom, for example, is say left finishing/binding edge, bottom staple. BottomLeft is bottom finishing/binding edge, with left staple. There are two possible finishing/binding edges, and the finishing/binding edges can be derived from these (compound) ordered pair enumerations.

Next page illustrates another example. But in this example, it goes from Intent back to IPP space by reversing the source/target orientations from the two spaces.

Here the same function is used, but swap the orientations. Whereas it required a +90 degree rotation to orient image in Intent space, here is a −90 degree rotation, to map back from Intent→IPP spaces. And, where in Intent space had a lower left finishing position, in IPP space it gets back to the original upper left specification (top left).

$${finishingOrientationCTM, intentfinishingIndexSet} =$$

$$rotateIndexSetSourceToTargetOrientation3D[$$

$$finishingIndexSetSingleLeftTop$$

(*finising index set in IPP space*)

$$zRotate3D[0\ Degree],$$ (*image orientation in IPP space*)

$$space \cdot Unrotated\ is Upright^*)$$

-continued

*reverseLandscapeIPPTransform* (*image orientation in IPP space**)

]

{{{0, 1, 0, 0}, {−1, 0, 0, 0}, {0, 0, 1, 0}, {0, 0, 0, 1}}, {2, 2, 0, 1}}

*finishingOrientationCTM*

$$\begin{pmatrix} 0 & 1 & 0 & 0 \\ -1 & 0 & 0 & 0 \\ 0 & 0 & 1 & 0 \\ 0 & 0 & 0 & 1 \end{pmatrix}$$

(*Above is equivalent to a −90 degree rotation*)

*zRotate3D*[−90 Degree]

$$\begin{pmatrix} 0 & 1 & 0 & 0 \\ -1 & 0 & 0 & 0 \\ 0 & 0 & 1 & 0 \\ 0 & 0 & 0 & 1 \end{pmatrix}$$

By simply specifying orientations and finishing positions in either space, it is possible to forward/inverse the process. The process is mathematically "invertible".

Returning to Intent space, here there is the transforms/CTMs for upright images and new finishing position. Now turning into Device space, it comes in two variations: 1) logical finishing edge in Intent space, and 2) physical finishing edge in Device space. In this example the stapler is inverted 180 degrees about the x-axis in 3D space. The physical device space describes stapling positions, e.g., front or back, finishing down vs. finishing up in 3D space. For example, a stapler may fire down or up into a sheet, depending upon a given paper path and orientation of the particular stapler (physical finishing device orientation).

Looking at another example, which will highlight rotations for finishing. As described above, the finishing edges is shown as rotation matrices, which are "duals" of orientations. Trying the following in IPP space:

{*finishingOrientationCTM*, *intentfinishingIndexSet*} =

*rotateIndexSetSourceToTargetOrientation3D*[

*finishingIndexSetDualTop*, (*finishing index set in IPP space**)

*landscapeIPPTransform*, (*image orientation in IPP space**)

*zRotate3D*[0 Degree]

(*image orientation in Intent space. Unrotated is Upright**)]

*finishingOrientationCTM*

$$\begin{pmatrix} 0 & 1 & 0 & 0 \\ -1 & 0 & 0 & 0 \\ 0 & 0 & 1 & 0 \\ 0 & 0 & 0 & 1 \end{pmatrix}$$

(* Above is equivalent to a −90 degree rotation *)

*zRotate3D*[−90 Degree]

$$\begin{pmatrix} 0 & 1 & 0 & 0 \\ -1 & 0 & 0 & 0 \\ 0 & 0 & 1 & 0 \\ 0 & 0 & 0 & 1 \end{pmatrix}$$

(* Simple lookup table function that explains index sets *)
getFinishingIndexSetsAll[intentfinishingIndexSet]
{{finishingIndexSetDualRight,{{2,0,0,1},{2,2,0,1}}}}

Above starts with a landscape orientation in IPP space, and find the rotation needed for upright in Intent space is −90 degrees (CCW). Likewise, the finishing was "rotated" too, from dual top, to dual right. This is intentional because a "finishing rotation" is required. The finishing rotation aligns Intent finishing edge to logical device finishing edge. This is left side in this example.

The following finds the finishing/binding edge from an index set enum. Note there are two possible finishing edges if this finishing operation is only designating a corner.

*getFinishingEdges*[*SymbolName*[

*Unevaluate*[*finishingIndexSetSingleRightBottom*]

*finishingIndexSetSingleRightBottom*

$$rightFinishingEdge \quad \begin{matrix} -1 & 0 & 0 & 0 \\ 0 & -1 & 0 & 0 \\ 0 & 0 & 1 & 0 \\ 0 & 0 & 0 & 1 \end{matrix}$$

$$bottomFinishingEdge \quad \begin{matrix} 0 & -1 & 0 & 0 \\ 1 & 0 & 0 & 0 \\ 0 & 0 & 1 & 0 \\ 0 & 0 & 0 & 1 \end{matrix}$$

$$rightFinishingEdge \quad \begin{pmatrix} -1 & 0 & 0 & 0 \\ 0 & -1 & 0 & 0 \\ 0 & 0 & 1 & 0 \\ 0 & 0 & 0 & 1 \end{pmatrix}$$

$$bottomFinishingEdge \quad \begin{pmatrix} 0 & -1 & 0 & 0 \\ 1 & 0 & 0 & 0 \\ 0 & 0 & 1 & 0 \\ 0 & 0 & 0 & 1 \end{pmatrix}$$

*bottomeFinishingEdge* == *zRotate3D*[+90 Degree] · *leftFinishingEdge*

True

This is a corner finishing position, so there are two possible finishing edges. As illustrated the finishing edge may be derived from the finishing index set. This is important to automatically determine the required finishing rotation. As mentioned earlier about duality, first images are aligned to Intent space orientation (upright), and the same rotation is applied to the finishing. Now, a finishing rotation needed (align Intent finishing edge to logical device finishing edge) is determined, and then the same finishing rotation to the image is applied. The image to finishing transform is fixed. Therefor rotating one, requires rotating the corresponding other.

The last line above shows how finishing edges are a dual orientation/rotation matrix. They can be simply rotated.

Likewise, the same technique used earlier to automatically determine required image rotation applies equally to finishing orientations and position.

To setup for the next part, find the finishing edge from this example of dual right that was mapped IPP→Intent.

$$getFinishingIndexSetsAll[intentFinishingIndexSet]$$

$$\{\{finishingindexSetDualRight, \{\{2, 0, 0, 1\}, \{2, 2, 0, 1\}\}\}\}$$

$$finishingIndexSetDualRight\ rightFinishingEdge\ \begin{pmatrix} -1 & 0 & 0 & 0 \\ 0 & -1 & 0 & 0 \\ 0 & 0 & 1 & 0 \\ 0 & 0 & 0 & 1 \end{pmatrix}$$

$$rightFinishingEdge$$

$$\begin{pmatrix} -1 & 0 & 0 & 0 \\ 0 & -1 & 0 & 0 \\ 0 & 0 & 1 & 0 \\ 0 & 0 & 0 & 1 \end{pmatrix}$$

Starting with dual top in IPP space, to dual right in Intent space, the finishing rotation must be identified or discovered. Next that rotation is applied to the image. The finishing to image transform is always fixed. Conceptually, as can be seen the dual right needs to be rotated 180 degrees to align to the left finishing/binding edge. There is nothing special about a left finishing edge, chosen arbitrarily. The algorithms allow any binding edge to be specified, and all rotations are automatically determined and applied Using the rotation discovery approach of the present invention, the same approach is used for images and finishing, as follows:

$$leftFinishingEdge$$

$$\begin{pmatrix} 1 & 0 & 0 & 0 \\ 0 & 1 & 0 & 0 \\ 0 & 0 & 1 & 0 \\ 0 & 0 & 0 & 1 \end{pmatrix}$$

$$rightFinishingEdge$$

$$\begin{pmatrix} -1 & 0 & 0 & 0 \\ 0 & -1 & 0 & 0 \\ 0 & 0 & 1 & 0 \\ 0 & 0 & 0 & 1 \end{pmatrix}$$

$$leftFinishingEdge \cdot Inverse[rightFinishingEdge]$$

$$\begin{pmatrix} -1 & 0 & 0 & 0 \\ 0 & -1 & 0 & 0 \\ 0 & 0 & 1 & 0 \\ 0 & 0 & 0 & 1 \end{pmatrix}$$

$$zRotate3D[180\ Degree]$$

$$\begin{pmatrix} -1 & 0 & 0 & 0 \\ 0 & -1 & 0 & 0 \\ 0 & 0 & 1 & 0 \\ 0 & 0 & 0 & 1 \end{pmatrix}$$

The rotation discovered or identified is 180 degrees to align Intent right finishing edge to logical left device finishing edge. Since this is in Intent space, if the finishing edge is on the left, the leftFinishingEdge is just the Identity Matrix. For computational efficiency, since this specific example has a left finishing edge, the identity Matrix does not have to be applied. Rather, just the inverse may be used. However, when a different finishing edge is specified, this must be included. For other products, there may be a different logical and/or physical finishing edges, which would be significant for other paper paths and finishing devices.

In terms of duality, rightFinishingEdge is an orientation, and the rotation required is the same matrix, but it is also a rotation matrix. Orientations are described via rotation matrices relative to an arbitrarily chosen canonical orientation (e.g. left edge). The logical device finishing edge orientation is also relative to an upright image in Intent space.

The imageOrientationCTM must be updated for this scenario. This updated CTM is then applied to the finishing rotation to the image CTM to create a final image rotation.

$$imageOrientationCTM = zRotate3D[180\ Degree]$$

$$\begin{pmatrix} -1 & 0 & 0 & 0 \\ 0 & -1 & 0 & 0 \\ 0 & 0 & 1 & 0 \\ 0 & 0 & 0 & 1 \end{pmatrix}$$

$$imageToIPPTransform =$$

$$landscapeIPPTransform \cdot Inverse[imageOrientationCTM]$$

$$\begin{pmatrix} 0 & 1 & 0 & 0 \\ 1 & 0 & 0 & 0 \\ 0 & 0 & 1 & 0 \\ 0 & 0 & 0 & 1 \end{pmatrix}$$

$$zRotate3D[-90\ Degree]$$

$$\begin{pmatrix} 0 & 1 & 0 & 0 \\ -1 & 0 & 0 & 0 \\ 0 & 0 & 1 & 0 \\ 0 & 0 & 0 & 1 \end{pmatrix}$$

This "discovers" that the rotation from upside down starting position to IPP landscape requires a −90 degree rotation. This calculates rotation from the start and finish orientations. Traditionally, enums are used for positions, and conditional logic and case statements mixed with arithmetic is used to keep track of orientations and rotations. For complex scenarios this can be quite challenging to keep track of these values. Matrix based operations greatly simplifies processing by eliminating the burden of conditional logic; composition of matrix-based rotation/reflection operations and orientations greatly simplifies, making for concise/accurate logic.

Since in this example, the canonical orientation is Upright, a zero rotation by convention that is equal to the Identity Matrix (or left finishing edge). The rotation is discovered to get to canonical orientation, where a landscape is oriented is upright orientation.

Since the IPP orientation is in this patent described as a rotation from canonical/Intent upright viewing orientation, taking the inverse returns to upright. Remembering that orientation and rotations are a duality, as illustrated the inverse produces the rotation needed to return IPP landscape orientation to upright, a −90 degree rotation CCW.

Inverse[landscapeIPPTransform]

$$\begin{pmatrix} 0 & 1 & 0 & 0 \\ 1 & 0 & 0 & 0 \\ 0 & 0 & 1 & 0 \\ 0 & 0 & 0 & 1 \end{pmatrix}$$

zRotate3D[−90 Degree]

$$\begin{pmatrix} 0 & 1 & 0 & 0 \\ -1 & 0 & 0 & 0 \\ 0 & 0 & 1 & 0 \\ 0 & 0 & 0 & 1 \end{pmatrix}$$

Here is the transform from IPP landscape to upright in Intent space, and updating the CTM. In Intent space, images will always be upright, as read by the user. In other words, after applying the rotation to the current image orientation (which in this case is landscapeIPPTransform) the rotated orientation can be nullified by matrix multiplying with its inverse.

Putting it all together, first the angle to rotate from 180 upside down to landscape IPP orientation is identified, which is a −90 degree rotation from 180 (now then at −90 degrees).

imageOrientationCTM =

Inverse[landscapeIPPTransform] · imageOrientationCTM $$\begin{pmatrix} 0 & 1 & 0 & 0 \\ -1 & 0 & 0 & 0 \\ 0 & 0 & 1 & 0 \\ 0 & 0 & 0 & 1 \end{pmatrix}$$

Next, the image must be put in the "upright" orientation. So regardless of the original image orientation, what is the transform to upright the landscape image? That is, in this case, another inverse of landscape. Whereas the above is used to determine a rotation (from 180, which is in this case equivalent to a 180, to landscape orientation), for this case the inverse of the landscape orientation will also produce a −90 rotation, but for different reason. The full update from original −180 orientation to −90 IPP landscape orientation to upright is the composite of these operations.

Applying the same operation again of the inverse landscape transformation should now make the image orientation upright. In non-matrix terms 180−90−90=0 (in degrees). Since upright by definition is the canonical orientation, rotation angle of 0 produces the "unrotated" orientation. The CTM is updated accordingly. A zero rotation gives us a rotation matrix that is functionally equivalent to the Identity Matrix.

imageOrientationCTM =

Inverse[landscapeIPPTransform] · imageOrientationCTM $$\begin{pmatrix} 1 & 0 & 0 & 0 \\ 0 & 1 & 0 & 0 \\ 0 & 0 & 1 & 0 \\ 0 & 0 & 0 & 1 \end{pmatrix}$$

Given the dual right finishing request, and knowing that for this example the left edge is the device finishing edge, this must be rotated 180 degrees to the logical finishing. To maintain the image to finishing orientation, likewise the image must be rotated.

Here the image orientation is updated for dual right finishing position. Previously it was identified a rotation is required for finishing 180 degrees to align right edge finishing to logical device right edge. So now rotate the image similarly. In other words, the same rotation amount is applied to the image as the finishing transform/CTM that was calculated separately.

Note: Recall that, for this example, the left edge was arbitrarily chosen as the logical device finishing edge. Likewise, as an example, the physical device orientation in 3D was arbitrarily chosen. Different product can and do typically have varying finishing device orientations. Further, it is common to have multiple finishing device components on a product (e.g., stapler, hole punch, folding unit), and each can have their own orientation and set of distinct local finishing positions and required orientations. Finally components used in different MFDs can use the same finishing device component, but be integrated into a different paper path with a different orientation. In each of these instances, with this new approach, it is relatively simple to specify the configuration and required image rotations and finishing positions will be automatically calculated. In this sense, these algorithms support an extensible framework that can work across a wide range of possible physical device configurations.

Note: logical in the sense of the sheet/stack being face-up when finishing. For example, logically a stapling device in this scenario would "fire" down into the face-up sheet. Contrast that to devices that finish and output sheets face-down. In that paper path, the actual physical device would "fire" a staple up (+z direction, towards ceiling) into the sheet/stack.

finishingOrientationCTM $$\begin{pmatrix} -1 & 0 & 0 & 0 \\ 0 & -1 & 0 & 0 \\ 0 & 0 & 1 & 0 \\ 0 & 0 & 0 & 1 \end{pmatrix}$$

The current image orientation per the CTM is upright. Now the finishing CTM to the image is applied. Recall that the users intent was for dual staple right, whereas the finishing edge is left, so a 180 rotation is required to align Intent finishing edge with logical device finishing edge.

imageOrientationCTM = finishingOrientationCTM · imageOrientationCTM $$\begin{pmatrix} -1 & 0 & 0 & 0 \\ 0 & -1 & 0 & 0 \\ 0 & 0 & 1 & 0 \\ 0 & 0 & 0 & 1 \end{pmatrix}$$

To recap. The original image orientation was upside down, 180. The transform for the correct IPP orientation, and then the transform to place IPP into Intent (upright) orientation was determined. So the orientation was "normalized" to intent. Turns out for this finishing request of dual right, since a left finishing edge is selected, it is also required the image upside down, 180. Since CTMs are calculated here without applying rotation to the final step, it is clear that the original orientation was already in the correct orientation, so the rotation needed will work out to zero (using the same rotation discovery technique). The rotation amount would vary based on finishing selected, actual finishing edge, and original image orientation. It is an optimization to not perform the intermediate rotation on the actual image. Where this would be helpful is in debugging orientation problems, to observe the image orientation at each step. Simple to do with very minor additional debugging code.
Physical Device Space In this example there is a logical leftFinishingEdge. But that is with a +z direction. Physically, some finishers are such that the relative orientation in 3D is a rotation about the x-axis in 3D. We use the same mapping function for Intent→Device space (device is e.g. stapler at the upside-down orientation—staples up in the +z direction).

What the following shows is that the logical finishing position of bottom left gets mapped to physical finishing position of top left. The process is invertible. Therefore, if physical finishing positions are required e.g. sets, like single, dual hole/staple, triple hole/staple, map from Device→Intent space, and then Intent→IPP space. Mappings can be in both directions and automatically calculated.

$\{finishingOrientationCTM, deviceFinishingIndexSet\} =$ $rotateIndexSetSourceToTargetOrientation3D[$ $finishingIndexSetSingleBottomeLeft$ (*finishing index set in Index space*)

$zRotate3D[0\ Degree],$ (*logical finishing edge in Intent space.*)

$xRotate3D[180\ Degree]$ (*finishing edge in 3D rotated Device space, about the $x-axis$*)]

$finishingOrientationCTM$ $\begin{pmatrix} -1 & 0 & 0 & 0 \\ 0 & -1 & 0 & 0 \\ 0 & 0 & 1 & 0 \\ 0 & 0 & 0 & 1 \end{pmatrix}$ The above is equivalent to a 180 degree rotation about the x-axis in 3D (underscores the need for a 3D framework for physical devices, where in this paper path, the lead sheet is face down).

$xRotate3D[180\ Degree]$ $\begin{pmatrix} -1 & 0 & 0 & 0 \\ 0 & -1 & 0 & 0 \\ 0 & 0 & 1 & 0 \\ 0 & 0 & 0 & 1 \end{pmatrix}$ $getFinishingIndexSetsAll[deviceFinishingIndexSet]$ $\{\{finishingIndexSetSingleLeftTop, \{\{0, 2, 0, 1\}\}\},$ $\{finishingIndexSetSingleTopLeft, \{\{0, 2, 0, 1\}\}\}$ The input was a logical single bottom left finishing position. But that is equivalent to left bottom (there are two finishing edges, left and bottom). As illustrated from a device view with the paper rotated about the x-axis (face down), the physical position will be the upper left (top edge, left position) or the left upper (left edge, top position).
Device Independence Via Abstract Device Spaces This function demonstrates processing from start to finish. Since spaces are "decoupled", the IPP and Intent spaces are functionally independent of the Device finishing spaces. They will operate identically regardless of the particular finishing devices.

The signature of this example function that maps from input orientation, to IPP convention, to Intent space is as follows.
IPPToIntentToDevice[originalImageOrientationTransform, docOrientationIPPTransform, finishingNameIPP, logicalFinishingEdge, logicalToPhysicalFinisherTransform]

Here is the first example.

```
IPPToIntentToDevice[
    zRotate3D[ +90 Degree ] ,    // originalImageOrientationTransform
    reversePortraitIPPTransform, // docOrientationIPPTransform
    "staple-bottom-right",       // finishingNameIPP. Uses IPP convention
                                      standard enum names.
    leftFinishingEdge,           // logicalFinishingEdge
    xRotate3D[180 Degree]        // logicalToPhysicalFinisherTransform
];
```

In words, the input image is +90 degrees from upright. The top of the image is pointed to the left. The next two fields define the requested finishing in IPP convention. Note that the IPP convention is an abstract finishing representation that says nothing about the actual input image orientation. The goal of this convention is to specify a finishing request independent of the particular device configuration, device capabilities and specifics (e.g., around image and paper paths), and the orientation of how sheets may be loaded in feeder trays.

This example IPP request is for the abstract orientation of reverse portrait (defined here as an affine rotation matrix per invention), and the finishing is bottom right. Note that in IPP convention a finishing position is relative to a portrait oriented sheet, without consideration of the input image orientation and IPP orientation requested.

The logical finishing edge is, for an Intent face up sheet stack, which edge is the document finished on. For example, given a sheet, what edge does the finishing device use? Note that for a series of finishing devices, each may have different finishing edges although typically the same edge is used. For example, stapling and hole punch would typically occur on the same edge of the document. For product that perform right edge finishing, such as supporting a language that reads right-to-left, simply change this value and rotations will automatically be recalculated (not shown).

The last field, logicalToPhysicalFinisherTransform, has to do with the 3D orientation of a particular finishing device in a given product. Many existing products have a "face down" paper path, with implications for the physical orientation of a finishing component integrated into the particular hosting device, such as an MFD. This influences the actual finishing location in 3D. This mapping transforms the logical finishing device position to the physical finishing device position.

Existing approaches use functions like IPPToIntentToDevice[ ] to invoke logic for a specific hardware configuration. Here virtually all arguments are functions/transforms as well (the IPP name "staple-bottom-right" is for convenience, and mapped internally to a matrix). Recall for example that a finishing edge is defined as a rotation. To use this function, and specify its values, requires no special knowledge of the multi-space computational framework. Changing a device logical and physical characteristics is trivial, and new rotations/mappings are all correctly automatically updated via concise code.

Image headers may be augmented with CTMs that explain the orientation at each step, which is very helpful for debugging, if needed, but for understanding image transformations from a system perspective. There are finishing devices today that export device capabilities to the host machine when attached. Using conventions here, device orientations can be transmitted and factored in to calculations automatically, obviating the need for custom coding and making dynamic finishing component integration possible, with predictable outcomes.
IPPToIntentToDevice[zRotate3D[+90 Degree], reversePortraitIPPTransform, "staple-bottom-right", leftFinishingEdge, xRotate3D[180 Degree]];

---

Rotation from starting/original orientation to IPP: 90
Rotation from IPP to Intent: 180
Intent finishing:
({
  {finishingIndexSetSingleLeftTop, {{0,2,0,1}}},
  {finishingIndexSetSingleTopLeft, {{0,2,0,1}}}
})
Intent finishing edge(s):
{
  {finishingIndexSetSingleLeftTop, {
    {leftFinishingEdge, {
      {1, 0,0, 0},
      {0, 1,0, 0},
      {0, 0,1, 0},
      {0, 0,0, 1}
    }},
    {topFinishingEdge, {
      {0, 1,0, 0
      {−1, 0,0, 0},
      {0, 0,1, 0},
      {0, 0,0, 1}
    }}
  }}
}

---

Rotation from Intent to logical finisher edge: 0
Total image rotation start→logical finishing position: 270
logical finishing position: finishingIndexSetSingleLeftTop
physical finishing position: finishingIndexSetSingleLeftBottom
Rotation from Intent to logical finisher edge: 90
Total image rotation start→logical finishing position: 0
logical finishing position: finishingIndexSetSingleLeftBottom
physical finishing position: finishingIndexSetSingleLeftTop Explanation of above results. The input image is facing "left", or from upright, rotated 90 degrees CCW. The finishing request is an upside down Portrait (aka reverse Portrait orientation in IPP convention). To go from 90 to requested IPP orientation requires an addition +90, which makes the new image orientation 180, that is the reverse portrait orientation. The stapling request, for bottom right, but remember that the document in this example is upside down. If you were to view this request in upright (Intent) orientation, that bottom right position would become a top left position. However, being a corner position, it can alternatively be, in Intent orientation, either a left or top finishing edge. Corner finishing has two possible edges which is significant when media is loaded LEF or SEF.

Rotation matrices are automatically determined to apply to the image depending upon which finish edge and position is used. Either will produce the same Intent output. These matrices are converted into a discrete rotation angle via lookup tables. The first matrix show in a 0 rotation matrix (visually and functionally similar to an Identity Matrix), the second is a 90 degree rotation matrix. If a GPU or computer graphics package such as OpenGL were used, the matrix values would be consumed directly.

Two scenarios due to corner finishing are explained. To summarize, after a 270 degree image rotation from starting 90 degree orientation, the image is upright, and the logical finishing position will be upper left (LeftTop). But the paper path here is face down, with head of document towards user in this contrived example. Which means rather that the upper left (away from user), in this device the staple position in an inverted paper path and device the sheet is now face down and the head of the image is towards the user. Left Bottom would be from a device perspective. The staple position closest to the front of the device where the user stands. In 3D, the finishing device component orientation is a 3D rotation about the x-axis, as part of functioning in a face down paper path.

A note on the Copy/Scan/Fax path. While this has example highlights mappings with print documents using the IPP finishing convention, the same principles apply to other pathways. While not IPP, a scan-based application will have similar issues with input image orientation and finishing request specification. Minimally, the IPP mapping here could be removed and input image orientation could be mapped to Intent space as also shown above. Underlying this approach are abstractions to finishing positions, image orientations, and finisher device/component orientation that are generic and easily applied to any protocol or convention.

The final example keeps the original image orientation and IPP the same, resulting in the same Intent space mappings. To demonstrate the decoupling, we arbitrarily define a face down paper path and relative finishing device orientation, but with the head of the face down sheet facing away from the user. This is a 3D inversion but about the y-axis instead of the x-axis used in the previous example. Since the logic is not coupled to a particular device configuration, it is trivial to change the logical to physical finishing device transform and the new image rotations and finishing positions are automatically determined.

---

IPPToIntentToDevice[
  zRotate3D[ +90 Degree ],    // originalImageOrientationTransform
  reversePortraitIPPTransform,    // docOrientationIPPTransform
  "staple-bottom-right",    // finishingNameIPP. Uses IPP convention standard enum names.
  leftFinishingEdge,    // logicalFinishingEdge
  yRotate3D[180 Degree]    // logicalToPhysicalFinisherTransform
];

---

The results are shown on the following page. As expected, a 180 degree rotation is required.

---

Rotation from starting/original orientation to IPP: 90
Rotation from IPP to Intent: 180
Intent finishing:
({
  {finishingIndexSetSingleLeftTop, {{0,2,0,1}}},
  {finishingIndexSetSingleTopLeft, {{0,2,0,1}}}
})
Intent finishing edge(s):
{

-continued

```
{finishingIndexSetSingleLeftTop, {
 {leftFinishingEdge, {
     {1, 0,0, 0},
     {0, 1,0, 0},
     {0, 0,1, 0},
     {0, 0,0, 1}
  }},
  {topFinishingEdge, {
     {0, 1,0, 0
     {-1, 0,0, 0},
     {0, 0,1, 0},
     {0, 0,0, 1}
   }}
 }}
}
Rotation from Intent to logical finisher edge: 0
Total image rotation start->logical finishing position: 270
logical finishing position: finishingIndexSetSingleLeftTop
physical finishing position: finishingIndexSetSingleRightTop
Rotation from Intent to logical finisher edge: 90
Total image rotation start->logical finishing position: 0
logical finishing position: finishingIndexSetSingleLeftBottom
physical finishing position: finishingIndexSetSingleRightBottom
```

Note that everything here except for the physical finishing position is identical. The final finishing position went from Left Bottom to Right Top, which is a cell space position rotation of 180 degrees.

An important final mention of image and paper paths. While not specifically addressed in this patent, a device will have a canonical orientation and imaging and paper-related components such as paper trays, paper paths, and finishing components, will be relative to an overall system orientation. While a marking component that places images onto sheets has not been shown here specifically, its 3D device orientation is matched to other components in the paper path, such as a finishing component. The same logical-to-physical transform used by the finisher would also be applied to a marking device. Therefore, implicit in this second example is the top of the image in this second scenario is away from the user standing in front of the device. While still face down, the image orientation for this second example would likewise be 180 degrees rotated due to a different paper path.

The following is the code used to map between multiple finishing spaces. There are a few other supporting functions not shown.

```
IPPToIntentToDevice[ originalImageOrientationTransform,
docOrientationIPPTransform_, finishingNameIPP ,
logicalFinishingEdge_, logicalToPhysicalFinisherTransform] :=
  Block[
    {
      imageToIPPTransform, imageToIPPRotationDegrees, finishingInfoMap,
      finishingValueIPP, finishingNameIndexSet, finishingValueIndexSet,
      docIPPtoIntentTransform, intentFinishingIndexSet,
      docIPPtoIntentRotationDegrees, finishingSetIntentAll, finishingEdges,
      intentToLogicalFinisherTransform, logicalFinisherIndexSet, totalImageRotation,
      physicalFinisherIndexSet
    };
    (* Calculate rotation needed to align starting image orientation with IPP document
orientation convention *)
      imageToIPPTransform = docOrientationIPPTransform . Inverse[
originalImageOrientationTransform];
      imageToIPPRotationDegrees = rotationMatrix3DLUT[ imageToIPPTransform ][[1]];
      Print[ "Rotation from starting/original orientation to IPP:\t",
imageToIPPRotationDegrees];
      (* Get finishing info from enum value *)
      finishingInfoMap = Flatten[ Take[ lookupFinishingByNameIPP[ finishingNameIPP ], 1]
];
      (* finishingNameIPP = finishingInfoMap[[1]]; *)
      finishingValueIPP = finishingInfoMap[[2]];
      finishingNameIndexSet = finishingInfoMap[[3]];
      finishingValueIndexSet = ToExpression[ finishingNameIndexSet ];
      (* Rotate finishing indexes from IPP\[Rule] Intent spaces *)
      {docIPPtoIntentTransform, intentFinishingIndexSet}=
rotateIndexSetSourceToTargetOrientation3D[
        finishing ValueIndexSet,     (* finishing index set in Intent space *)
        docOrientationIPPTransform , (* image orientation in IPP space *)
        zRotate3D[ 0 Degree ]         (* image orientation in Intent space. Unrotated
is Upright *)
      ];
      docIPPtoIntentRotationDegrees = rotationMatrix3DLUT[ docIPPtoIntentTransform ]
[[1]];
      Print[ "Rotation from IPP to Intent:\t", docIPPtoIntentRotationDegrees];
      (* May be 2 values if corner with different finishing edges *)
      finishingSetIntentAll = getFinishingIndexSetsAll[ intentFinishingIndexSet ];
      Print["Intent finishing:\n\t", finishingSetIntentAll // MatrixForm];
      finishingEdges = getFinishingEdges[ finishingSetIntentAll [[1, 1]] ]; (*Will be two
finishing edges for corner positions *)
      Print["Intent finishing edge(s):\n\t", finishingEdges // TableForm];
(* For either 1 or 2 finishing edges, calculate the rotation to logicalFinishingEdge.and
rotate the finishing values *)
      For[ i = 0, i < Length[ finishingEdges [[1, 2]] ], i++;
        Block[
          {},
          {intentToLogicalFinisherTransform,logicalFinisherIndexSet}=
rotateIndexSetSourceToTargetOrientation3D[
            intentFinishingIndexSet,    (* finishing index set in Intent space *)
            finishingEdges[[1, 2, i, 2]],  (* finishing edge in Intent space *)
```

```
        logicalFinishingEdge            (* image orientation in Intent space. Unrotated
is Upright *)
        ];
Print["Rotation Intent to logical finisher edge:\t", rotationMatrix3DLUT[
        intentToLogicalFinisherTransform ][[1]] ];
totalImageRotation=
        intentToLogicalFinisherTransform.docIPPtoIntentTransform.imageToIPPTransform;
Print[ "Total image rotation start->logical finishing position:\t", rotationMatrix3DLUT[
        totalImageRotation ][[1]] ];
Print["logical finishing position:
        ", getFinishingIndexSetsAll[ logicalFinisherIndexSet ] [[1, 1]] ];
{logicalToPhysicalFinisherTransform, physicalFinisherIndexSet} =
rotateIndexSetSourceToTargetOrientation3D[
        logicalFinisherIndexSet,        (* finishing index set in Intent space *)
        logicalFinishingEdge,           (* logical finishing edge in Intent space *)
        logicalToPhysicalFinisherTransform.logicalFinishingEdge
                                        (* physical finishing edge *)
        ];
Print["physical finishing position:
", getFinishingIndexSetsAll[ physicalFinisherIndexSet ] [[1, 1]] ];
        Print["\n"];
    ]
];
Return[ (* The following additional output has been suppressed for brevity *)
    {
        imageToIPPTransform, imageToIPPRotationDegrees,
        finishingInfoMap, finishingNameIPP, finishingNameIndexSet,
        finishingValueIndexSet,
        docIPPtoIntentTransform, intentFinishingIndexSet,
        docIPPtoIntentRotationDegrees, finishingSetIntentAll,
            finishingEdges,
        intentToLogicalFinisherTransform, logicalFinisherIndexSet,
        logicalFinishingEdge
    }
];
]
```

Other Variations

It should be understood that the flow diagrams depicted herein are illustrative. One or more of the operations illustrated in any of the flow diagrams may be performed in a differing order. Other operations, for example, may be added, modified, enhanced, condensed, integrated, or consolidated. Variations thereof are envisioned and are intended to fall within the scope of the appended claims.

It should also be understood that the method described in the flowcharts provided herewith can be implemented on a special purpose computer, a microprocessor or micro-controller, an ASIC or other integrated circuit, a DSP, an electronic circuit such as a discrete element circuit, a programmable device such as a PLD, PLA, FPGA, PAL, PDA, and the like. In general, any device capable of implementing a finite state machine that is in turn capable of implementing one or more elements of the flow diagrams provided herewith, or portions thereof, can be used. Portions of the flow diagrams may also be implemented partially or fully in hardware in conjunction with machine executable instructions.

Furthermore, the flow diagrams hereof may be partially or fully implemented in software using object or object-oriented software development environments that provide portable source code that can be used on a variety of computer, workstation, server, network, or other hardware platforms. One or more of the capabilities hereof can be emulated in a virtual environment as provided by an operating system, specialized programs or leverage off-the-shelf computer graphics software such as that in Windows, Java, or from a server or hardware accelerator or other image processing devices.

The teachings hereof can be implemented in hardware or software using any known or later developed systems, structures, devices, and/or software by those skilled in the applicable art without undue experimentation from the functional description provided herein with a general knowledge of the relevant arts.

Moreover, the methods hereof may be readily implemented as software executed on a programmed general purpose computer, a special purpose computer, a microprocessor, or the like. In this case, the methods hereof can be implemented as a routine embedded on a personal computer or as a resource residing on a server or workstation, such as a routine embedded in a plug-in, a photocopier, a driver, a scanner, a photographic system, a xerographic device, or the like. The methods provided herein can also be implemented by physical incorporation into an image processing or color management system.

One or more aspects of the methods described herein are intended to be incorporated in an article of manufacture, including one or more computer program products, having computer usable or machine readable media. For purposes hereof, a computer usable or machine readable media containing machine readable instructions, for example, a floppy disk, a hard-drive, memory, CD-ROM, DVD, tape, cassette, or other digital or analog media, or the like, which is capable of having embodied thereon a computer readable program, one or more logical instructions, or other machine executable codes or commands that implement and facilitate the function, capability, and methodologies described herein. Furthermore, the article of manufacture may be included on at least one storage device readable by a machine architecture or other xerographic or image processing system embodying executable program instructions capable of performing the methodology described in the flow diagrams. Additionally, the article of manufacture may be included as part of a xerographic system, an operating system, a plug-in, or may be shipped, sold, leased, or otherwise provided separately either alone or as part of an add-on, update, upgrade, or product suite.

It will be appreciated that various of the above-disclosed and other features and functions, or alternatives thereof, may be desirably combined into many other different systems or applications. Various presently unforeseen or unanticipated alternatives, modifications, variations, or improvements therein may become apparent and/or subsequently made by those skilled in the art which are also intended to be encompassed by the following claims. Accordingly, the embodiments set forth above are considered to be illustrative and not limiting. Various changes to the above-described embodiments may be made without departing from the spirit and scope of the invention. The teachings of any printed publications including patents and patent applications, are each separately hereby incorporated by reference in their entity.

What is claimed is:

1. A method for mapping a user's selection for a finishing job to a subsystem of an imaging device comprising:
   receiving a selection representing one or more selectable finishing properties relative to an intent orientation with an intent finishing edge for a finishing job with an identified imaging device;
   accessing input image data in an input orientation for the finishing job:
   obtaining a first transformation representing a first mapping between input image data in the input orientation and a first orientation;
   obtaining a second transformation representing a second mapping between the first orientation and the identified imaging device; and
   performing a transformation operation on the input image data to create transformed image data by transforming the input image data through the first transformation and the second transformation, whereby the transformed image data implements the one or more selectable finishing properties relative to the intent orientation.

2. The method of claim 1, further comprising:
   storing the transformed image data for printing later.

3. The method of claim 1, further comprising:
   printing the transformed image data on the identified imaging device.

4. The method of claim 2, wherein the finishing job includes a finisher unit operation and the identified imaging device includes an identified finisher unit, and further comprising:
   obtaining a third transformation representing a third mapping between the identified imaging device and the identified finisher unit; and
   wherein the performing the transformation operation on the input image data to create the transformed image data by transforming the input image data through the first transformation and the second transformation and the third transformation.

5. The method of claim 3, wherein the finishing job includes a finisher unit operation and the identified imaging device includes an identified finisher unit, and further comprising:
   obtaining a third transformation representing a third mapping between the identified imaging device and the identified finisher unit; and
   wherein the performing the transformation operation on the input image data to create the transformed image data by transforming the input image data through the first transformation and the second transformation and the third transformation.

6. The method of claim 2, wherein the finishing job includes a print protocol and the identified imaging device includes an identified print protocol, and further comprising:
   obtaining a third transformation representing a third mapping between the identified print protocol and the first orientation; and
   wherein the performing the transformation operation on the input image data to create the transformed image data by transforming the input image data through the first transformation and the second transformation and the third transformation.

7. The method of claim 3, wherein the finishing job includes a print protocol the identified imaging device includes an identified print protocol, and further comprising:
   obtaining a third transformation representing a third mapping between the identified print protocol and the first orientation; and
   wherein the performing the transformation operation on the input image data to create the transformed image data by transforming the input image data through the first transformation and the second transformation and the third transformation.

8. The method of claim 2, wherein the finishing job includes a print protocol and a finisher unit operation and the identified imaging device includes an identified print protocol and an identified finisher unit, and further comprising:
   obtaining a third transformation representing a third mapping between the identified print protocol and the first orientation;
   obtaining a fourth transformation representing a fourth mapping between the identified imaging device and the identified finisher unit; and
   wherein the performing the transformation operation on the input image data to create the transformed image data by transforming the input image data through the first transformation and the second transformation and the third transformation and the fourth transformation.

9. The method of claim 3, wherein the finishing job includes a print protocol and a finisher unit operation and the identified imaging device includes an identified print protocol and an identified finisher unit, and further comprising:
   obtaining a third transformation representing a third mapping between the identified print protocol and the first orientation;
   obtaining a fourth transformation representing a fourth mapping between the identified imaging device and the identified finisher unit; and
   wherein the performing the transformation operation on the input image data to create the transformed image data by transforming the input image data through the first transformation and the second transformation and the third transformation and the fourth transformation.

10. The method of claim 2, wherein the finishing job includes a copy/scan/fax operation and the identified imaging device includes an identified copy/scan/fax platen, and further comprising:
    obtaining a third transformation representing a third mapping between the identified copy/scan/fax platen/fax and the first orientation; and
    wherein the performing the transformation operation on the input image data to create the transformed image data by transforming the input image data through the first transformation and the second transformation and the third transformation.

11. The method of claim 3, wherein the finishing job includes a copy/scan/fax operation and the identified imaging device includes an identified copy/scan/fax platen, and further comprising:
- obtaining a third transformation representing a third mapping between the identified copy/scan/fax platen and the first orientation; and
- wherein the performing the transformation operation on the input image data to create the transformed image data by transforming the input image data through the first transformation and the second transformation and the third transformation.

12. The method of claim 2, wherein the finishing job includes an automatic document feeder operation and the identified imaging device includes an identified automatic document feeder, and further comprising:
- obtaining a third transformation representing a third mapping between the identified automatic document feeder and the first orientation; and
- wherein the performing the transformation operation on the input image data to create the transformed image data by transforming the input image data through the first transformation and the second transformation and the third transformation.

13. The method of claim 3, wherein the finishing job includes an automatic document feeder operation and the identified imaging device includes an identified automatic document feeder, and further comprising:
- obtaining a third transformation representing a third mapping between the identified automatic document feeder and the first orientation; and
- wherein the performing the transformation operation on the input image data to create the transformed image data by transforming the input image data through the first transformation and the second transformation and the third transformation.

14. The method of claim 2, wherein the finishing job includes an automatic document feeder operation and a copy/scan/fax platen operation and the identified imaging device includes an identified automatic document feeder and an identified copy/scan/fax platen, and further comprising:
- obtaining a third transformation representing a third mapping between the identified automatic document feeder and the identified copy/scan/fax platen;
- obtaining a fourth transformation representing a fourth mapping between the identified copy/scan/fax platen and the first orientation; and
- wherein the performing the transformation operation on the input image data to create the transformed image data by transforming the input image data through the first transformation and the second transformation and the third transformation and the fourth transformation.

15. The method of claim 3, wherein the finishing job includes an automatic document feeder operation and a copy/scan/fax platen operation and the identified imaging device includes an identified automatic document feeder and an identified copy/scan/fax platen, and further comprising:
- obtaining a third transformation representing a third mapping between the identified automatic document feeder and the identified copy/scan/fax platen;
- obtaining a fourth transformation representing a fourth mapping between the identified copy/scan/fax platen and the first orientation; and
- wherein the performing the transformation operation on the input image data to create the transformed image data by transforming the input image data through the first transformation and the second transformation and the third transformation and the fourth transformation.

16. The method of claim 2, wherein the finishing job includes an automatic document feeder operation and a finisher unit operation and the identified imaging device includes an identified automatic document feeder and an identified finisher unit, and further comprising:
- obtaining a third transformation representing a third mapping between the identified automatic document feeder and the first orientation;
- obtaining a fourth transformation representing a fourth mapping between the identified imaging device and the identified finisher unit; and
- wherein the performing the transformation operation on the input image data to create the transformed image data by transforming the input image data through the first transformation and the second transformation and the third transformation and the fourth transformation.

17. The method of claim 3, wherein the finishing job includes an automatic document feeder operation and a finisher unit operation and the identified imaging device includes an identified automatic document feeder and an identified finisher unit, and further comprising:
- obtaining a third transformation representing a third mapping between the identified automatic document feeder and the first orientation;
- obtaining a fourth transformation representing a fourth mapping between the identified imaging device and the identified finisher unit; and
- wherein the performing the transformation operation on the input image data to create the transformed image data by transforming the input image data through the first transformation and the second transformation and the third transformation and the fourth transformation.

18. The method of claim 3 wherein the finishing job includes a copy/scan/fax operation and a finisher unit operation and the identified imaging device includes an identified copy/scan/fax platen and an identified finisher unit, and further comprising:
- obtaining a third transformation representing a third mapping between the identified copy/scan/fax platen and the first orientation;
- obtaining a fourth transformation representing a fourth mapping between the identified imaging device and the identified finisher unit; and
- wherein the performing the transformation operation on the input image data to create the transformed image data by transforming the input image data through the first transformation and the second transformation and the third transformation and the fourth transformation.

19. The method of claim 4, wherein the receiving a selection representing one or more selectable finishing properties for a finishing job of image data includes one or more selectable properties for the finishing job of landscape or portrait orientation, print margins, double sided printing, enlarge or reduce print area, paper size, paper or media type, booklet, hole punch position on a finishing edge, and staple position on a finishing edge.

20. A method for printing comprising:
- receiving a selection representing one or more selectable finishing properties relative to an intent orientation for a finishing job includes an identified print protocol with an identified imaging device and an identified finisher unit, the one or more selectable finishing properties for a finishing job of image data includes one or more selectable properties for the finishing job of landscape or portrait orientation, print margins, double sided printing, enlarge or reduce print area, paper size, paper or media type, booklet, hole punch position on a finishing edge, and staple position on a finishing edge;

accessing input image data in an input orientation for the finishing job;

obtaining a first transformation representing a first mapping between the identified print protocol and a first orientation;

obtaining a second transformation representing a second mapping between input image data in the input orientation and a first orientation;

obtaining a third transformation representing a second mapping between the first orientation and the identified imaging device;

obtaining a fourth transformation representing a fourth mapping between the identified imaging device and the identified finisher unit;

performing a transformation operation on the input image data to create transformed image data by transforming the input image data through the first transformation and the second transformation and the third transformation and the fourth transformation; and printing the transformed image data on the identified imaging device.

* * * * *